US009057842B2

(12) United States Patent
Sato

(10) Patent No.: US 9,057,842 B2
(45) Date of Patent: Jun. 16, 2015

(54) POLARIZING PLATE, METHOD OF MANUFACTURING THE SAME AND LIQUID CRYSTAL DISPLAY EMPLOYING THE SAME

(75) Inventor: Hideyuki Sato, Tokyo (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 152 days.

(21) Appl. No.: 13/383,330

(22) PCT Filed: Jan. 21, 2010

(86) PCT No.: PCT/JP2010/050694

§ 371 (c)(1), (2), (4) Date: Jan. 10, 2012

(87) PCT Pub. No.: WO2011/007587

PCT Pub. Date: Jan. 20, 2011

(65) Prior Publication Data

US 2012/0133868 A1 May 31, 2012

(30) Foreign Application Priority Data

Jul. 15, 2009 (JP) ................................ 2009-166458

(51) Int. Cl.

| | |
|---|---|
| ***C09K 19/00*** | (2006.01) |
| ***G02F 1/1335*** | (2006.01) |
| ***G02B 5/30*** | (2006.01) |
| ***B32B 27/00*** | (2006.01) |

(52) U.S. Cl.

CPC ......... *G02B 5/3033* (2013.01); *B32B 2457/202* (2013.01); *B32B 27/00* (2013.01); *G02F 1/133528* (2013.01); *G02F 2201/50* (2013.01)

(58) Field of Classification Search

None

See application file for complete search history.

(56) References Cited

U.S. PATENT DOCUMENTS

| | | | | |
|---|---|---|---|---|
| 6,512,562 | B1 * | 1/2003 | Kobayashi et al. | 349/122 |
| 2005/0045064 | A1 * | 3/2005 | Oya | 106/170.27 |
| 2009/0033833 | A1 * | 2/2009 | Aminaka | 349/68 |
| 2009/0086125 | A1 * | 4/2009 | Ohtani et al. | 349/96 |
| 2009/0251642 | A1 * | 10/2009 | Nakamura et al. | 349/75 |

FOREIGN PATENT DOCUMENTS

| | | |
|---|---|---|
| JP | 2000-356714 | 12/2000 |
| JP | 2002-082223 | 3/2002 |
| JP | 2002-082226 | 3/2002 |
| JP | 2007-169523 | 7/2007 |
| JP | 2009-025604 | 2/2009 |

* cited by examiner

*Primary Examiner* — Ellen S Wood

*Assistant Examiner* — Anthony J Frost

(74) *Attorney, Agent, or Firm* — Lucas & Mercanti, LLP

(57) ABSTRACT

Disclosed are a polarizing plate manufacturable by a manufacturing method safe in work and less imposing a burden on the environment using protective films excellent in adhesion with the polarizer and a method for manufacturing the same. A liquid crystal display device using the polarizing plate and having both a large viewing angle and a high visibility (high contrast and so forth) is also disclosed. The polarizing plate made by holding both surfaces of the polarizer held with protective films is characterized in that at least one protective film is a protective film hydrophilized by either a plasma treatment or a corona treatment and that the surface energy of the protective films before the hydrophilization and the surface energy of the protective films after the hydrophilization satisfy a predetermined relational expression.

10 Claims, 3 Drawing Sheets

POLARIZING PLATE, METHOD OF MANUFACTURING THE SAME AND LIQUID CRYSTAL DISPLAY EMPLOYING THE SAME

CROSS REFERENCE TO RELATED APPLICATION

This Application is a 371 of PCT/JP2010/050694 filed on Jan. 21, 2010 which, in turn, claimed the priority of Japanese Patent Application No. 2009-166458 filed on Jul. 15, 2009, both applications are incorporated by reference herein.

FIELD OF THE INVENTION

The present invention relates to a polarizing plate, a method of manufacturing the same and a liquid crystal display employing the same, and, in more detail, relates to a polarizing plate manufactured by a method which assures safety work and suffers from less environmental load using a protective film having an excellent adhesive property with a polarizer, and, further, relates to a liquid crystal display employing the polarizing plate, the liquid crystal display exhibiting both high viewing angle and high visibility.

BACKGROUND OF THE INVENTION

As a polarizing plate protective film, well known have been polymer films, for example, cellulose ester, polyethylene telephthalate (PET), cycloolephine polymer (COP), polycarbonate (PC). A great many methods to adhere one of these films onto a polarizer typified by polyvinyl alcohol (PVA) have been known.

As a polarizing plate protective film, a cellulose ester film has been used more widely than other thermoplastic films, since adhering•drying with a PVA polarizer smoothly proceeds due to its moderate moisture permeability.

However, since cellulose ester itself shows a hydrophobic nature, a hydrophilic treatment such as an alkali saponification, a corona treatment or a plasma treatment is needed before the adhering process of cellulose ester with PVA.

Among these hydrophilic treatments, alkali saponification has been most widely known. However, since a high temperature and high concentration alkali aqueous solution is used in this method, the workability and working environment is poor. Specifically, with respect to diacetyl cellulose which has been traditionally used as an optical film such as a λ/4 film, there has been a problem that a part of the film is dissolved into the alkali solution and the deposited stuff thereof contaminates the process. Accordingly, a surface hydrophilic treatment other than an alkali saponification method has been desired.

As a surface hydrophilic treatment which replaces the alkali saponification, for example, a corona treatment and a plasma treatment have been examined so far (for example, refer to Patent Documents 1 and 2).

However, in order to provide a sufficient hydrophilic property employing these methods, a strong treatment is required. In such a treatment, there have been problems, for example, contamination of the process due to deposition of white foreign substance formed by the decomposition of the film, and increase in film haze, accompanied by lowering of front contrast when used in a liquid crystal display. Specifically, it has been known that the protective film provided on the liquid crystal cell side largely affects the front contrast of a liquid crystal display.

PRIOR ART DOCUMENTS

Patent Documents

Patent Document 1: Japanese Patent Application Publication Open to Public Inspection (hereinafter referred to as JP-A) No. 2000-356714

Patent Document 2: JP-A No. 2002-82226

SUMMARY OF THE INVENTION

Problems to be Solved by the Invention

In view of the foregoing problems, the present invention was achieved. An object of the present invention to provide a polarizing plate manufactured by a method which assures safety work and suffers from less environmental load using a protective film having an excellent adhesive property with a polarizer, and a method of manufacturing the polarizing plate, as well as to provide, employing the polarizing plate, a liquid crystal display exhibiting both high viewing angle and high visibility (for example, a high contrast).

Means to Solve Problems

Above object according to the present invention is achieved by the following means.

1. A polarizing plate comprising a polarizer sandwiched between protective films, wherein at least one protective film is subjected to a hydrophilic treatment via a plasma treatment or a corona treatment, wherein a surface energy of the at least one protective film before the hydrophilic treatment meets Formula (SI) and a surface energy of the at least one protective film after the hydrophilic treatment meets Formula (SII):

$$0.25 \le \gamma_{sh}/\gamma_{sp} < 1.5 \quad \text{Formula (SI):}$$

$$1.5 \le \gamma_{sh}/\gamma_{sp} \le 4.0 \quad \text{Formula (SII):}$$

wherein $\gamma_{sh}$ represents a hydrogen bond component of the surface energy and $\gamma_{sp}$ represents a polar component of the surface energy.

2. The polarizing plate of above Item 1, wherein a center line average surface roughness (Ra) of a surface of the protective film being subjected to the hydrophilic treatment is within the range of 2.0 to 10.0 nm.

3. The polarizing plate of above Item 1 or 2, wherein the at least one protective film is a retardation film, wherein an in-plane retardation value Ro(590) defined by following Formula (RI) is within the range of 30 to 90 nm and a retardation value in the thickness direction Rt(590) defined by following Formula (RII) is within the range of 70 to 300 nm, $$Ro(590)=(n_x-n_y)\times d(\text{nm}) \quad \text{Formula (RI):}$$

$$Rt(590)=\{(n_x+n_y)/2-n_z\}\times d(\text{nm}) \quad \text{Formula (RII):}$$

wherein Ro(590) represents a value of retardation within a film plane at a wavelength of 590 nm, Rt(590) represents a value of retardation in the thickness direction of the film at a wavelength of 590 nm, d represents a thickness (nm) of the optical film, $n_x$ represents a maximum refractive index in the film plane at a wavelength of 590 nm which is also referred to as a refractive index in a slow axis direction, $n_y$ represents a refractive index in a direction perpendicular to the slow axis direction in the film plane at a wavelength of 590 nm, and $n_z$ represents a refractive index in the thickness direction of the film at a wavelength of 590 nm.

4. The polarizing plate of any one of above Items 1 to 3, wherein an internal haze of the protective film being subjected to the hydrophilic treatment is 0.1 or less.

5. The polarizing plate of any one of above Items 1 to 4, wherein the protective film being subjected to the hydrophilic treatment comprises a cellulose ester.

6. The polarizing plate of any one of above Items 1 to 5, wherein the protective film being subjected to the hydrophilic treatment comprises a cellulose ester having a solubility parameter (also referred to as a SP value) of 120 or more but 13.0 or less.

7. The polarizing, plate of any one of claims 1 to 5, wherein the protective film being subjected to the hydrophilic treatment comprises a diacetyl cellulose having an acetyl substitution degree of 2.1 or more but less than 2.5.

8. A method of manufacturing a polarizing plate comprising a polarizer sandwiched between protective films comprising the step of conducting a hydrophilic treatment via a plasma treatment or a corona treatment on at least one protective film, wherein a surface energy of the at least one protective film before the hydrophilic treatment meets Formula (SI) and a surface energy of the at least one protective film after the hydrophilic treatment meets Formula (SII):

$$0.25 \leq \gamma_{sh}/\gamma_{sp} < 1.5 \qquad \text{Formula (SI):}$$

$$1.5 \leq \gamma_{sh}/\gamma_{sp} \leq 4.0 \qquad \text{Formula (SII):}$$

wherein $\gamma_{sh}$, represents a hydrogen bond component of the surface energy and $\gamma_{sp}$ represents a polar component of the surface energy.

9. A liquid crystal display comprising a liquid crystal cell and two polarizing plates provided on both surfaces of the liquid crystal cell, wherein at least one polarizing plate of the two polarizing plates is the polarizing plate of any one of above Items 1 to 7 or a polarizing plate manufacture by the method of above Item 8.

Effect of the Invention

According to the above means of the present invention, a polarizing plate manufactured by a method which assures safety work and suffers from less environmental load using a protective film having an excellent adhesive property with a polarizer, and a method of manufacturing the polarizing plate can be provided. Also, by employing the polarizing plate, a liquid crystal display exhibiting both high viewing angle and high visibility (for example, a high contrast) can be provided.

With respect to the perception relating the mechanism to provide the effects of the present invention, the following items may be listed.

When the ratio of the hydrogen bond component ($\gamma_{sh}$) of the surface energy to a polar component ($\gamma_{sp}$) of the surface energy ($\gamma_{sh}/\gamma_{sp}$) is adjusted in the range which meets the above-mentioned relational Formula (SII) by a hydrophilic treatment, the adhesive property to PVA becomes good. The value of ($\gamma_{sh}/\gamma_{sp}$) indicates the ratio of a hydrogen bond component in the surface energy, and generally, the value becomes larger when a hydrophilic treatment proceeds.

However, it was found that in the case of triacetyl cellulose (TAC) or cellulose acetate propionate (CAP) for which it is difficult to have a film of which ratio of the hydrogen bond component ($\gamma_{sh}$) of the surface energy before a treatment to a polar component ($\gamma_{sp}$) of the surface energy before a treatment, namely, ($\gamma_{sh}/\gamma_{sp}$) is adjusted to be 0.25 or more, damage to a substrate due to, for example, heat may proceed and the haze is increased before relational Formula (SII) is satisfied, and in the case of such as diacetyl cellulose for which it is possible to have a film of which ratio of the hydrogen bond component ($\gamma_{sh}$) of the surface energy before treatment to a polar component ($\gamma_{sp}$) of the surface energy before treatment, namely, ($\gamma_{sh}/\gamma_{sp}$) is adjusted to be 0.25 or more, the surface can be processed to a surface energy state which is the same as the surface energy state obtained by saponification (namely, a state which meets the above-mentioned relational Formula (SII)) without decomposition of the substrate, namely, the protective film before treatment meets $0.25 \leq (\gamma_{sh}/\gamma_{sp})$.

It is also possible to conduct a hydrophilic treatment while keeping the film property by conducting a plasma treatment on a surface which is rich in hydrogen bond component in advance. Since a plasma treatment has an effect to increase the surface unevenness of a polarizing plate protective film, it contributes to improve the adhesive of the polarizing plate protective film with the polarizer surface according to an anchor effect.

However, if the unevenness is too large, haze on the surface of a film may increase, resulting in low contrast of a liquid crystal display. However, when the surface roughness Ra (center line average roughness) is controlled in a suitable range (2.0-10.0 nm), it is possible to control to obtain a suitable contrast. According to the method of the present invention, it has become possible to obtain the above moderate surface roughness.

BRIEF DESCRIPTION OF THE DRAWINGS

FIG. 1*a* illustrates a state when glycerin is dropped on a slide glass. FIG. 1*b* illustrates a state when a sample film is placed on the glycerin. FIG. 1*c* illustrates a state when glycerin is dropped on the sample film. FIG. 1*d* illustrates a state when a cover glass is placed on the glycerin.

EMBODIMENTS TO CARRY OUT THE INVENTION

Figure 1A:
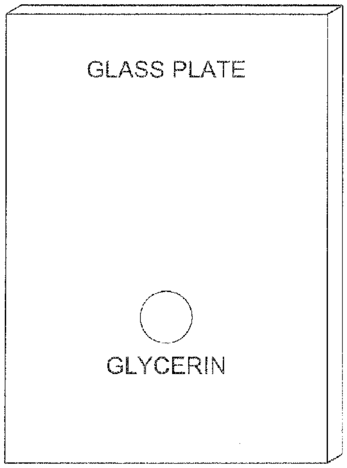
FIGS. 1*a* to 1*d* are schematic drawings showing a procedure to evaluate an internal haze.
Figure 1C:
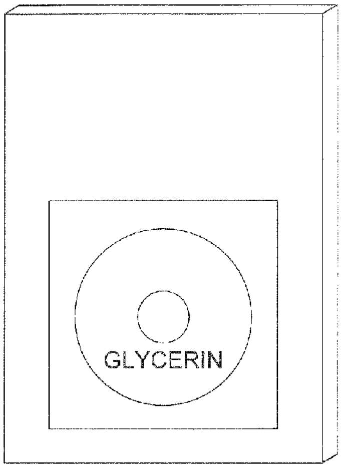
Figure 1B:
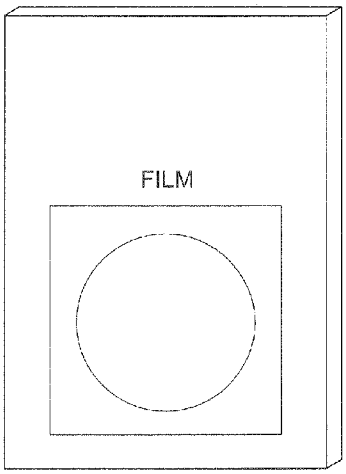
Figure 1D:
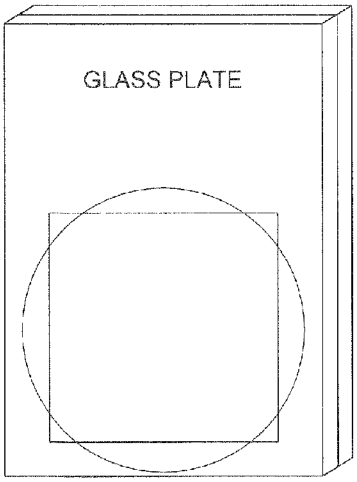

The polarizing plate of the present invention has a feature that the polarizing plate has a polarizer sandwiched between protective films on both surfaces of the polarizer, in which a protective film provided on at least one side of the polarizer is subjected to a hydrophilic treatment via a plasma treatment or a corona treatment and is characterized in that the surface energy of the protective film before the hydrophilic treatment meets aforementioned Formula (SI) and the surface energy of the protective film after the hydrophilic treatment meets aforementioned Formula (SII). This feature is a common technical feature throughout the invention according to claim 1 through claim 9.

As one of the embodiments of the present invention, the center line average surface roughness (Ra) of the protective film surface treated as above is preferably in the range of 2.0-10.0 nm, in view of exhibiting the effect of the present invention. Further, the aforementioned hydrophilic treated protective film is a retardation film and preferably has an in-plane retardation value Ro(590) expressed by aforementioned Formula (R1) in the range of 30-90 nm and a retardation value in the thickness direction Rth (590) expressed by the Formula (R2) in the range of 70-300 nm. Furthermore, the haze of the aforementioned hydrophilic treated protective film is preferably 0.1 or less.

In the present invention, it is preferable that the hydrophilic treated protective film is a film containing a cellulose ester. In this case, the hydrophilic treated protective film preferably contains a cellulose ester exhibiting a solubility parameter (SP value) of 12.0 or more but 13.0 or less. Further, the hydrophilic treated protective film is preferably a film containing a diacetyl cellulose having an acetyl substitution degree of 2.1 or more but less than 2.5.

The polarizing plate of the present invention is preferably applied to a liquid crystal display having a liquid crystal cell and two polarizing plates provided on both surfaces of the liquid crystal cell.

The present invention, constitution elements thereof, and the aspects embodiments to carry out the present invention will be explained in detail below.

<Surface Energy of Protection Film>

At least one protective film of the present invention constituting the polarizing plate of the present invention is one which is subjected to a hydrophilic treatment via a plasma treatment or a corona treatment and is characterized in that the surface energy of the protective film before the hydrophilic treatment meets Formula (SI) and the surface energy of the protective film after the hydrophilic treatment meets Formula (SII).

$$0.25 \le \gamma_{sh}/\gamma_{sp} < 1.5 \qquad \text{Formula (SI):}$$

$$1.5 \le \gamma_{sh}/\gamma_{sp} \le 4.0 \qquad \text{Formula (SII):}$$

wherein $\gamma_{sh}$ represents a hydrogen bond component of the surface energy and $\gamma_{sp}$ represents a polar component of the surface energy.

In the present invention, the ratio of the hydrogen bond component to the polar component ($\gamma_{sh}/\gamma_{sp}$) of the surface free energy before the hydrophilic treatment is preferably 0.28-1.0, and more preferably 0.30-0.50.

When t the ratio of the hydrogen bond component to the polar component ($\gamma_{sh}/\gamma_{sp}$) of the surface free energy before the hydrophilic treatment is less than 0.25, it is necessary to conduct a hydrophilic treatment such as a plasma treatment or a plasma treatment under a stronger condition in order to obtain a sufficient adhesiveness with the hydrophilic polarizer. It is known that such a treatment gives a thermal damage to the surface of the film, whereby the transparency of the film is remarkably spoiled.

When the ratio of the hydrogen bond component to the polar component ($\gamma_{sh}/\gamma_{sp}$) of the surface free energy before the hydrophilic treatment is larger than 0.25, the shape of the wound roll in the winding step it in the film manufacturing becomes worse. The ratio of the hydrogen bond component to the polar component ($\gamma_{sh}/\gamma_{sp}$) of the surface free energy before the hydrophilic treatment is preferably 0.5 or less.

The ratio of the hydrogen bond component to the polar component ($\gamma_{sh}/\gamma_{sp}$) of the surface free energy after the hydrophilic treatment is preferably in the range of 1.8-3.5, and more preferably in the range of 2.0-3.0. When it is 3.0 or less, a front contrast ratio of a liquid crystal display is more improved.

Examples of a method to vary the ratio of the hydrogen bond component to the polar component ($\gamma_{sh}/\gamma_{sp}$) of the surface free energy include a method to vary the substitution degree of cellulose ester, a method to vary the number of carbon atoms of a substituent, and a method to vary the structure or the adding amount of an additive. The ratio of the hydrogen bond component to the polar component ($\gamma_{sh}/\gamma_{sp}$) of the surface free energy can be varied by using in combination of these methods.

When the ratio of the hydrogen bond component to the polar component ($\gamma_{sh}/\gamma_{sp}$) of the surface free energy after the hydrophilic treatment is less than 1.5, the adhesiveness of the protective film with the polarizer becomes in sufficient, whereby the attainment of effect of the present invention becomes insufficient.

preferably 0.28-1.0, and more preferably 0.30-0.50.

When the surface free energy ratio of the film before or after the hydrophilic treatment is larger than the maximum value given in Formula (SI) or (SII), respectively, the moisture absorbing property of the film increases, and the coefficient of friction of the film in the winding process of after the film formation or after the hydrophilic treatment also increases, which results in causing a serious defect in the shape of the wound roll of the film. Also, a problem may arise that change in the retardation value or dimension of the film becomes larger due to the increase in enter or leave of moisture due to the change in temperature or humidity. When such a film is used in a liquid crystal display, a problem may arise that variation in viewing angle or in color hue becomes larger.

Accordingly, in order to prevent aforementioned problems, it is necessary to control the property of the film by selecting the kind of the material of a protective film or by selecting hydrophilic surface treatment condition, so that the surface energy of the protective film before the hydrophilic treatment meets aforementioned Formula (SI) and the surface energy of the protective film after the hydrophilic treatment meets aforementioned Formula (SII). As a more concrete method to control the surface free energy ($\gamma_{sh}/\gamma_{sp}$) before and after the hydrophilic treatment, the following methods may be cited. For example, the ($\gamma_{sh}/\gamma_{sp}$) value becomes smaller with increasing acy substitution degree of cellulose ester, the ($\gamma_{sh}/\gamma_{sp}$) value become smaller with increasing number of carbon atoms of the acyl group substituted in cellulose acetate, and the ($\gamma_{sh}/\gamma_{sp}$) value becomes smaller with increasing adding amount of a hydrophobic compound such as a plasticizer. Also, the ($\gamma_{sh}/\gamma_{sp}$) value can be increased by increasing the duration of hydrophilic treatment or by increasing the alkali content in the hydrophilic treatment. These methods may be used also in combination.

<Measurement of Surface Free Energy>

In the present invention, the surface free energy of the film was measured as follows.

Each of the contact angles of a solid state specimen using three standard liquids, namely, pure water, nitromethane, and methylene iodide was measured 5 times with a contact angle meter CA-V, produced by Kyowa Interface Science Co., Ltd. and an average contact angle was obtained by averaging the measured values. Next, three components of a surface energy of solid state were computed based on the Young-Dupre's formula, and the Extended Fowkes's formula.

Young-Dupre's formula:

$$W_{SL}=\gamma L(1+\cos\theta)$$

$W_{SL}$: adhesion energy between liquid/solid
$\gamma L$: surface free energy of a liquid
$\theta$: contact angle of liquid/solid
Extended Fowkes's formula:

$$W_{SL}=2\{(\gamma_{sd}\gamma L_d)^{1/2}+(\gamma_{sp}\gamma L_p)^{1/2}(\gamma_{sh}\gamma L_h)^{1/2}\}$$

$\gamma L=\gamma L_d+\gamma L_p+\gamma L_h$: surface free energy of liquid
$\gamma_s=\gamma_{sd}+\gamma_{sp}+\gamma_{sh}$: surface free energy of solid
$\gamma_d$, $\gamma_p$, $\gamma_h$: each component of surface free energy of dispersion component, polar component and hydrogen bond component, respectively.

Since each component value of surface free energy (mN/m) of a standard liquid has been known as shown in Table 5, each component of the surface energy of a surface of solid ($\gamma_{sd}$, $\gamma_{sp}$, $\gamma_{sh}$) can be obtained by solving simultaneous equations with 3 unknowns using the value of contacting angles.

<Internal Haze>

The internal haze of the protection film after the hydrophilic treatment according to the present invention is preferably 0.1 or less, more preferably 0.05 or less, and still more preferably 0.03 or less.

It had been said that it is necessary to reduce the haze of a cellulose ester film to improve the front contrast of a liquid crystal display, however it has become clear that, when the haze is separated into an internal haze and a surface haze, the effect to improve the front contrast of a liquid crystal display obtained by the improvement in internal haze is larger the effect obtained by the improvement in surface haze.

An internal haze means one caused by a light scattering substance existing in the inside of a film, where the inside of a film means the portion of the film more than 5 μm apart from the surface.

The internal haze is measured by a haze meter while the film is brought into a state in which the effect of the surface haze is eliminated as small as possible by dropping, on the interface with the film, a solvent of which difference in refractive index with the refractive index of the film is within ±0.05.

<Internal Haze Measuring Device>

Haze meter (turbidimeter) (Type: NDH 2000, produced by Nippon Denshoku Industries Co., Ltd.)

A 5V9W halogen lamp is used as a light source, and the silicon photo cell (with a relative luminous efficiency filter) is used for the light receiving section.

It is a feature of the present invention that the haze measured according to the following method is 0.05 or less, namely, the haze is measured with the above device using a solvent of which difference in refractive index with the refractive index of the film is within ±0.05 as an interface. The haze measurement is carried out according to the method of JIS K-7136.

The method to measure the internal haze will be explained with referring to FIG. 1, as follows.

First, blank haze 1 of a measuring instrument other than the film is measured.

1. On a cleaned slide glass, one drop of glycerin (0.05 ml) is placed. At this time, care should be taken not to include air bubbles. A slide glass cleaned with a detergent is used since a slide glass may be stained even when it looks clean (refer to FIG. 1*a*).
2. A cover glass is placed on it. Glycerin will be spread without pressing the cover glass.
3. The slide glass is set to a haze meter to measure blank haze 1.

Subsequently, haze 2 including the specimen is measured according to the following procedure.

4. Glycerin (0.05 ml) is dropped on a slide glass (refer to FIG. 1*a*).
5. A sample film to be measured is placed on it without incorporation of air bubbles (refer to FIG. 1*b*).
6. Glycerin (0.05 ml) is dropped on the sample film (refer to FIG. 1*c*).
7. A cover glass is placed on it (refer to FIG. 1*d*).
8. The laminate obtained as above (from the top, cover glass/glycerin/sample film/glycerin/slide glass) is set to a haze meter to measure haze 2.
9. (Haze 2)−(Haze 1)=(internal haze of the cellulose ester film according to the present invention) is calculated.

The cellulose ester film sample is prepared after being subjected to humidity control at 23° C. under 55% RH for 5 hours or more. All of the above measurements of haze are carded out at 23° C. under 55% RH.

The glass and the glycerin used in the above measurement are as follows.

Glass: MICRO SLIDE GLASS S9213 MATSUNAMI

Glycerol: Cica best grade (purity>99.0%), refractive index 1.47

<Cellulose Ester>

Varieties of resins well known in the art are applicable for the protective film of the present invention, however, preferable is a film containing cellulose ester. Further, the protective film is preferably a film containing diacetyl cellulose having an acetyl substitution degree of 2.1 or more but less than 2.5, since such a film is easily controlled so that the surface energy of the film before a hydrophilic treatment meets aforementioned Formula (SI) and the surface energy of the film after the hydrophilic treatment meets aforementioned Formula (SII).

The raw material cellulose of the cellulose ester according to the present invention is not specifically limited, however, examples of such a material include cotton linter, wood pulp and kenaf. The cellulose esters obtained from these materials may also be used by mixing with each other in any ratio.

The cellulose ester used for the present invention can be manufactured via a well-known method. Concretely, such cellulose ester can be synthesized with reference to a method described in JP-A No. 10-45804.

Examples of a commercially available cellulose ester include acetyl celluloses LM80, L20, L30, L40 and L50, produced by Daicel Corporation, and Ca398-3, Ca398-6, Ca398-10, Ca398-30 and Ca394-60S, produced by Eastman Chemical.

The total amount of calcium and magnesium (ppm) and the acetic acid amount (ppm) contained in the cellulose ester film according to the present invention preferably meet the following Relational formula (3).

Relational formula (3):

$$1\leq(\text{acetic acid amount (ppm)})/(\text{total amount (ppm) of calcium and magnesium})\leq30$$

Calcium and magnesium are contained in the cellulose ester used as a raw material of the cellulose ester film. However, calcium and magnesium may also be added in the form of a metal oxide, a metal hydroxide, or a metal salt (an inorganic acid salt or an organic acid salt) in order to neutralize•stabilize the acid catalyst (specifically, sulfuric acid) added in the cellulose ester producing process, or may be added in the form of a metal oxide, a metal hydroxide, or a metal salt (an inorganic acid salt or an organic acid salt) in the cellulose ester film forming process. The total amount of calcium and magnesium (ppm) contained in the cellulose ester film as mentioned in the present invention means a summed value thereof.

Acetic acid anhydride and acetic acid are used as a reaction catalyst or esterifying agent in the producing process of cellulose ester. Unreacted acetic acid anhydride is decomposed by a reaction terminating agent (for example, water, alcohol or acetic acid) to form an acetic acid. The total amount of acetic acid (ppm) contained in the cellulose ester film as mentioned in the present invention means a summed value of such a residual acid and a free acid.

In above Relational formula (3), (total amount (ppm) of calcium and magnesium)/(acetic acid amount (ppm)) is preferably 1 or more but 30 or less. The value of less than 1 means that the amount of acetic acid is not sufficient against the amount of calcium and magnesium, which is not preferable because photo scattering caused by metal salts of calcium and magnesium occurs, whereby contrast of a liquid crystal display is deteriorated. Alternatively, the value of larger than 30 means that the amount of acetic acid is excess against the amount of calcium and magnesium, which is not preferable because deterioration of polarizer due to acetic acid may be promoted after the cellulose ester film is adhered to the polarizer.

The total amount of calcium and magnesium contained in the cellulose ester film is preferably 5-130 ppm, more preferably 5-80 ppm, and still more preferably 5-50 ppm.

The amount of acetic acid contained in the cellulose ester film is preferably 20-550 ppm, more preferably 25-250 ppm, and still more preferably 30-150 ppm.

Determination of the amounts of calcium and magnesium may be conducted employing methods well known in the art. For example, the amounts of calcium and magnesium can be determined using an atomic absorption method after conducting a pretreatment in which a dried cellulose ester is completely burned, followed by dissolving the resulting ash in hydrochloric acid. The measured value is obtained as a content of calcium and magnesium in 1 g of completely dried cellulose ester using a unit of ppm.

Determination of the amounts of acetic acid may be conducted employing methods well known in the art. For example, the amount of acetic acid can be determined according to the following method. A film is dissolved in methylene chloride and reprecipitated by further adding methanol. The supernatant liquid is filtered and the amount of acetic acid can be obtained by measuring the supernatant liquid with gas chromatography.

The solubility parameter (also referred to as the SP value) of the cellulose ester used in the present invention is preferably 12.0 or more but 13.0 or less from the viewpoints of for example, the extent of energy necessary to conduct a hydrophilic treatment, avoiding deterioration of transparency of the substrate, and avoiding dimensional variation and retardation variation due to the variation of temperature and humidity.

The SP value is one of the important parameters to estimate a hydrophilic•hydrophobic nature of various chemical substances. The SP value can be defined by a mole evaporation heat MI and a molar volume V in the regular solution theory. The SP value can also be empirically predicted and can be calculated using the parameters of Hoy, Fedors and Small.

The SP value according to the present invention was calculated using parameters of Fedors which provides abundant parameters and is applicable to wide range of compounds. A unit of $(cm^2/cal)^{1/2}$ which is a square root of a value which obtained by dividing cohesion energy density $\Delta E$ with molar volume V is used. The parameters of Fedors are described in a reference document, pages 54-57 of "Basic Science for Coating" by Yuji Harada, published by Maki Shoten (1977).

<Additives of Cellulose Ester Film>

In the cellulose ester used in the present invention, varieties of additives (for example, a hydrolysis inhibitor, a retardation adjusting agent, a plasticizer, an ultraviolet absorption agent, an antioxidant, an acid scavenger and particles) according to use may be added as far as the surface energy of the film before the hydrophilic treatment meets aforementioned Formula (SI) and the surface energy of the film after the hydrophilic treatment meets aforementioned Formula (SII).

(Hydrolysis Inhibitor)

As a hydrolysis inhibitor, for example, a mixture of ester compounds each having one or more but 12 or less of at least one of a pyranose structure and a franose structure, provided that all or a part of OH groups in the structure are esterified. is preferably used.

With respect to the ratio of esterification of the ester compound having one or more but 12 or less of at least one of a pyranose structure and a franose structure, provided that all or a part of OH groups in the structure are esterified, it is preferable that 70% or more of OH groups contained in the pyranose structure or the franose structure are esterified.

Such ester compounds are also collectively referred to as saccharide ester compounds.

As examples of an ester compound, the following materials may be cited.

Such examples include glucose, galactose, mannose, fructose, xylose, arabinose, lactose, sucrose, nystose, 1F-fructosylnystose, stachyose, maltitol, lactitol, lactulose, cellobiose, maltose, cellotriose, maltotriose, raffinose and kestose.

Further, gentiobiose, gentiotriose, gentiotetraose, xylotriose, and galactosyl-sucrose may be cited.

Among these compounds, a compound having both a pyranose structure and a fructose structure is preferably used.

Examples of such a compound include sucrose, kestose, nystose, 1F-fructosylnystose and stachyose, and further preferable is sucrose.

An ester compound of oligosaccharide may also be employed as a compound having 1-12 of at least one of a pyranose structure and a fructose structure of the present invention.

The aforementioned ester compound is a compound obtained by condensing one or more but 12 or less of at least one of a pyranose structure and a furanose structure represented by following Formula (A), wherein $R_{11}$-$R_{15}$ and $R_{21}$-$R_{25}$ each represent an acyl group having 2-22 carbon atoms or a hydrogen atom, m and n each represent an integer of 0-12, and m+n is an integer of 1-12.

Formula (A)

$-(P)_m-$ $-(F)_n-$

P:

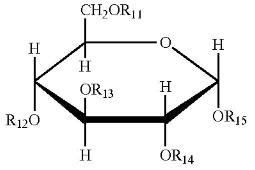

F:

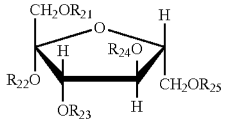

$R_{11}$ to $R_{15}$, $R_{21}$ to $R_{25}$ each are preferably a benzoyl group or a hydrogen atom. The benzoyl group may further have substituent $R_{26}$ examples of which include such as an alkyl group, an alkenyl group, an alkoxy group and a phenyl group, and these alkyl group, alkenyl group and phenyl group may further have a substituent.

Specific examples of an ester compound will be shown below.

A-1

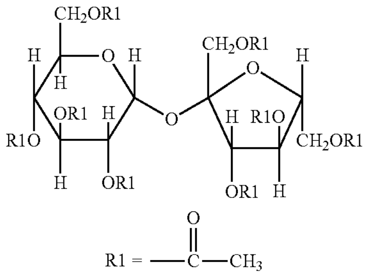

Average substitution degree 2.0

A-2

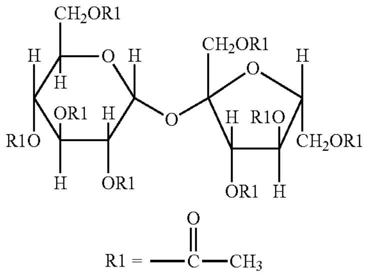

Average substitution degree 7.0

A-3

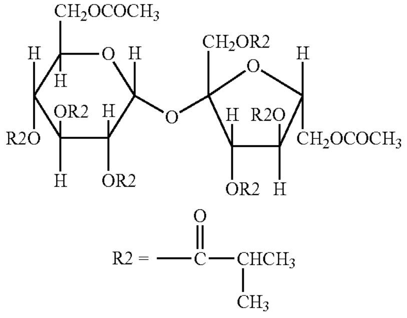

A-4

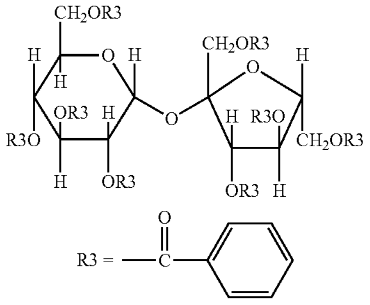

Average substitution degree 7.0

-continued

A-5

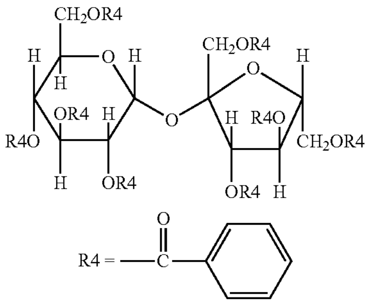

Average substitution degree 6.5

A-6

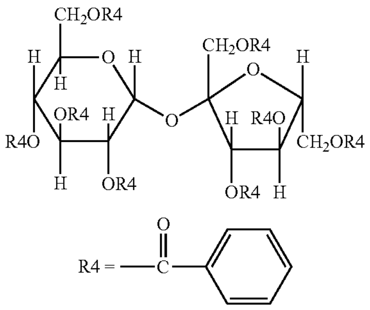

Average substitution degree 5.0

A-7

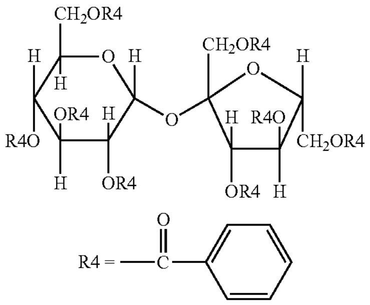

Average substitution degree 8.0

A-8

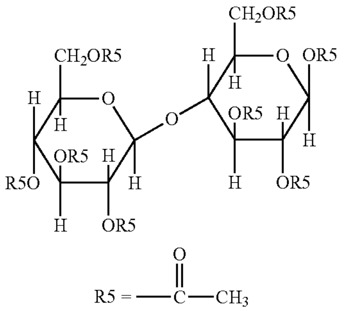

A-9

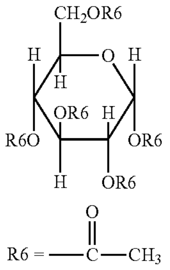

-continued
A-10
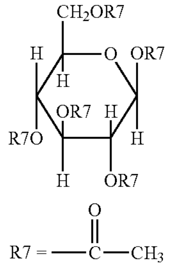
A-11
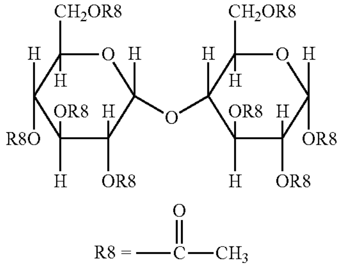
A-12
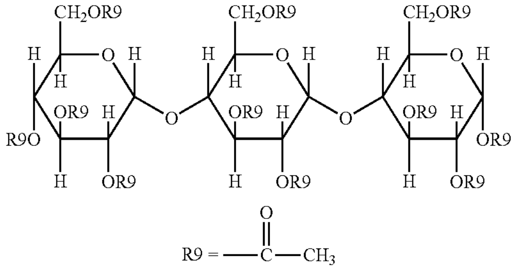
A-13
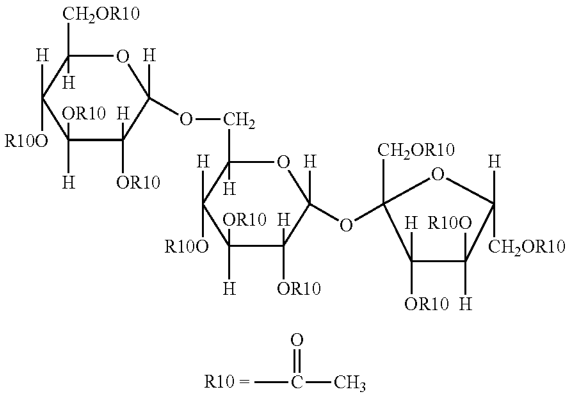
-continued
A-14
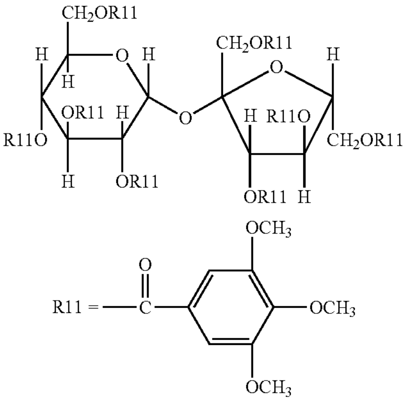
A-15
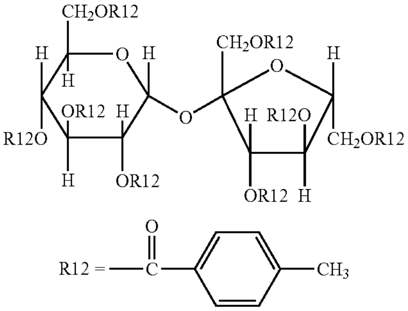
Average substitution degree 8.0
A-16
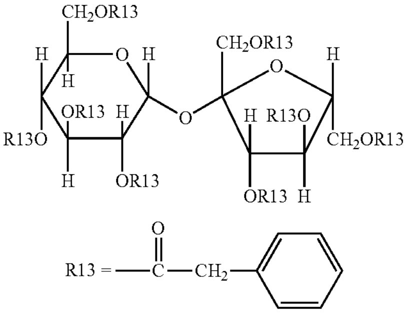
A-17
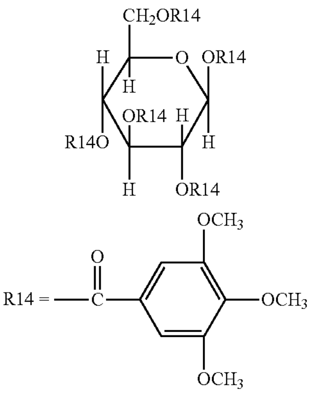

-continued
A-18
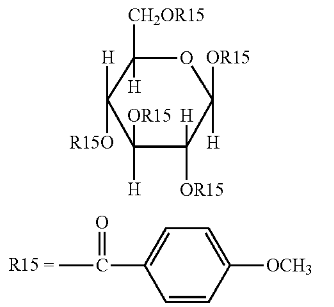
A-19
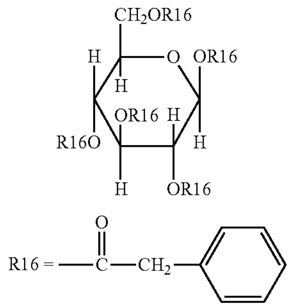
A-20
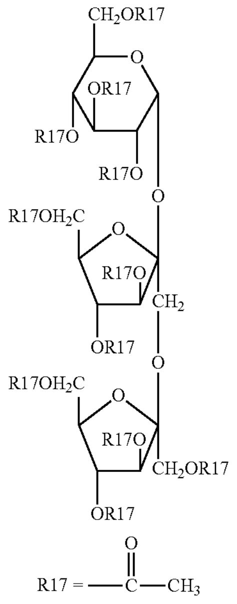
A-21
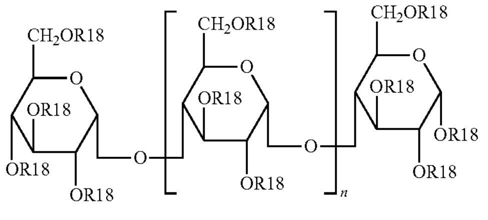
n = 2~8
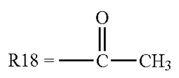
-continued
A-22
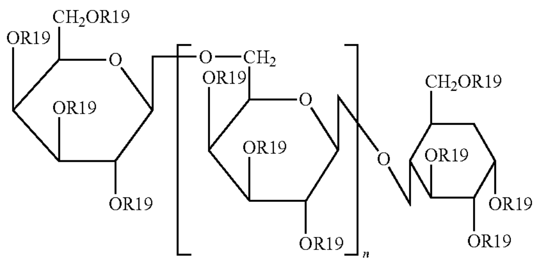
n = 1~8
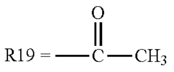
A-23
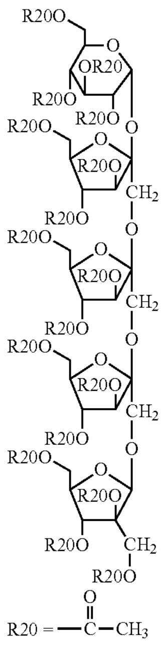
A-24
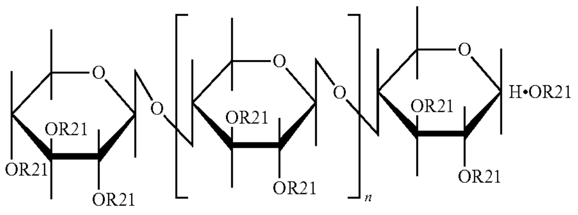
n = 1~8
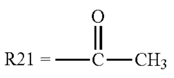

-continued

A-25

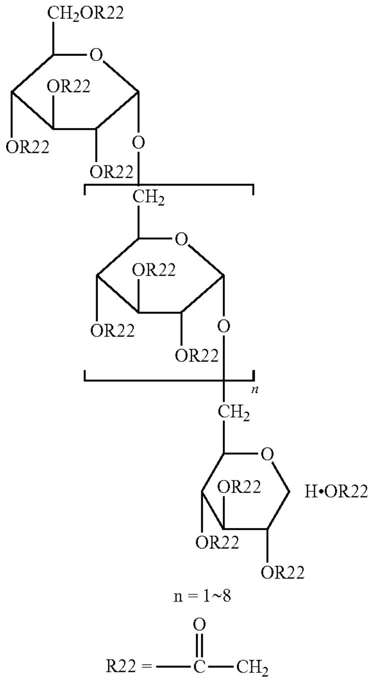

n = 1~8

The cellulose ester film of the present invention preferably contains 2-20% by mass of a hydrolysis inhibitor, and specifically preferably contains 5-15% by mass of a hydrolysis inhibitor.

(Retardation Adjusting Agent)

As a retardation adjusting agent, for example, an ester compound represented by following Formula (1) may be preferably used.

B-(G-A)*n*-G-B    Formula (1)

(wherein, B is a hydroxyl group or a benzene monocarboxylic acid residual group; G is an alkylene glycol residual group having a carbon number of 2 to 12, an aryl glycol residual group having a carbon number of 6 to 12, or an oxyalkylene glycol residual group having a carbon number of 4 to 12; A is an alkylene dicarboxylic acid residual group having a carbon number of 4 to 12 or an aryl dicarboxylic acid residual group having a carbon number of 6 to 12; and n is an integer of not less than 1.)

A compound represented by Formula (1) is comprised of a hydroxyl group or a benzene monocarboxylic acid residual group represented by B, an alkylene glycol residual group, an oxyalkylene glycol residual group or an arylglycol residual group represented by G, and an alkylen dicarboxylic acid residual group or an aryl dicarboxylic acid residual group represented by A; and can be prepared by a reaction similar to that of a general polyester compound.

A benzene monocarboxylic acid component of polyester type compound utilized in the present invention includes such as benzoic acid, p-tertiary-butylbenzoic acid, ortho-toluic acid, metha-toluic acid, para-toluic acid, dimethylbenzoic acid, ethylbenzoic acid, n-propylbenzoic acid, aminobenzoic acid and acetoxybenzoic acid, and these each may be utilized alone or as a mixture of not less than two types.

An alkylene glycol component having a carbon number of 2 to 12, which can be utilized in the present invention, includes such as ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol; and these glycols are utilized alone or as a mixture of at least two types.

An alkylene glycol having a carbon number of 2 to 12 is specifically preferable because of excellent compatibility with cellulose ester.

Further, an oxyalkylene glycol component, having a carbon number of 4 to 12, of the above-described aromatic terminal ester includes such as diethylene glycol, triethylene glycol, tetraethylene glycol, dipropylene glycol and tripropylene glycol; and these glycols can be utilized alone or as a mixture of two or more types.

An alkylene dicarboxylic acid component, having a carbon number of 4 to 12, of aromatic terminal ester includes such as maleic acid, fumaric acid, glutaric acid, adipic acid, azelaic acid, sebacic acid and dodecane dicarboxylic acid; and these may be utilized alone or as a mixture of not less than two types. An arylene dicarboxylic acid component having a carbon number of 6 to 12 include phthalic acid, terephthalic acid, isophthalic acid, 2,6-naphthalene dicarboxylic acid and 1,4-naphthalene dicarboxylic acid.

A polyester type compound utilized in the present invention preferably has a number average molecular weight in a range of 300 to 1,500 and more preferably of 400 to 1,000. Further, an acid value thereof is not more than 0.5 mg KOH/g and a hydroxyl group value of not more than 25 mg KOH/g and more preferably the acid value is not more than 0.3 mg KOH/g and the hydroxyl group value of not more than 15 mg KOH/g.

Concrete examples of a polyester type compound represented by Formula (1) will be shown below.

B-1

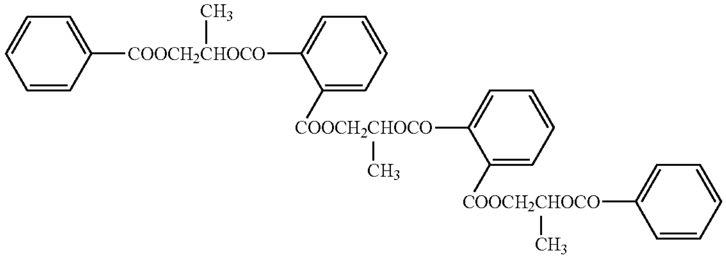

Mw: 696

-continued
B-2
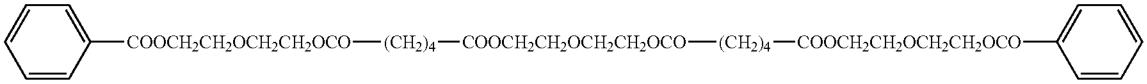
Mw: 746
B-3
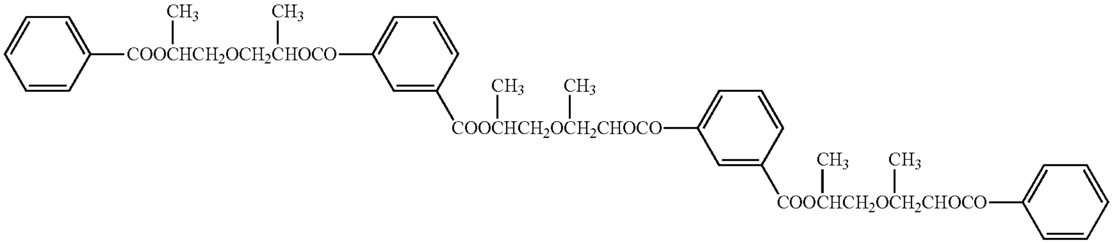
Mw: 830
B-4
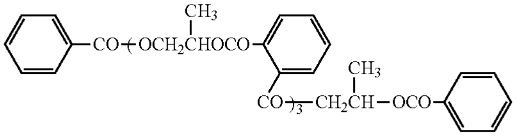
Mw: 886
B-5
Mw: 462
B-6
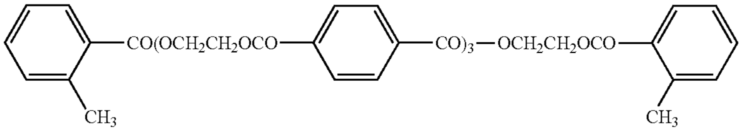
Mw: 874
B-7
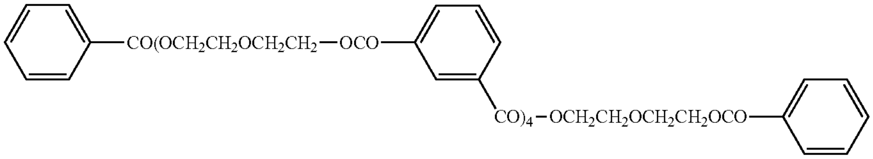
Mw: 1258
B-8
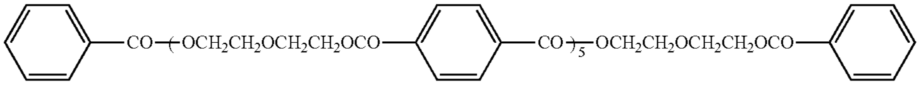
Mw: 1494
B-9
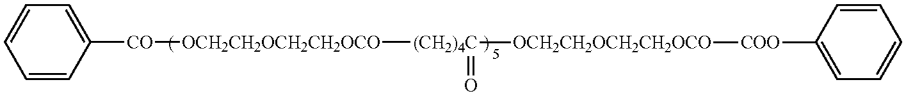
Mw: 1394
B-10
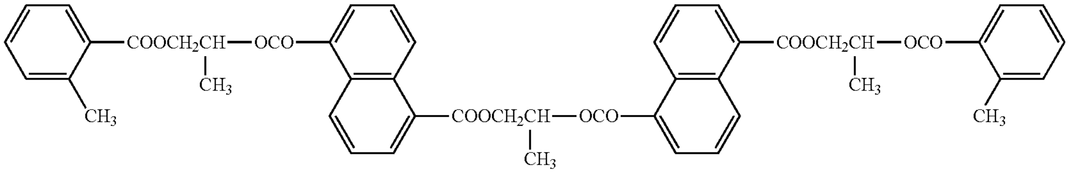
Mw: 852

-continued
B-11
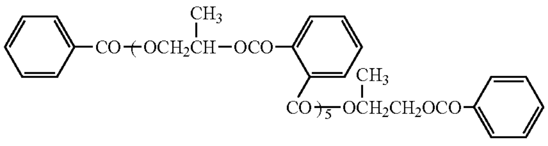
Mw: 1314
B-12
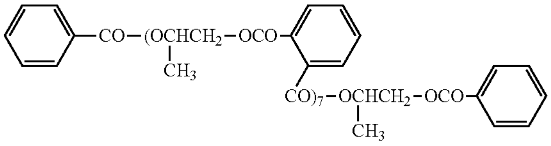
Mw: 1726
B-13
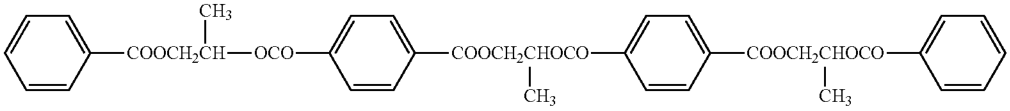
Mw: 696
B-14
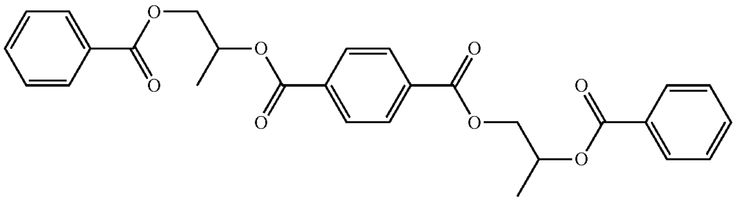
Mw: 491
B-15
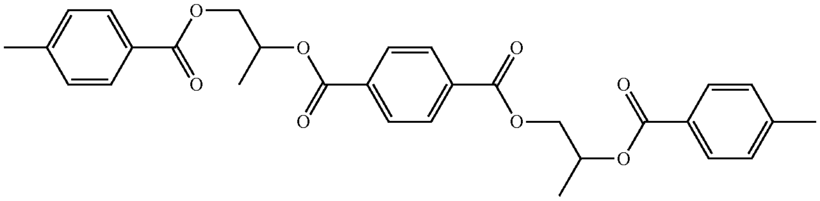
Mw: 591
B-16
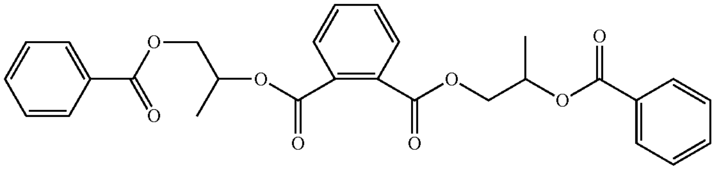
Mw: 491
B-17
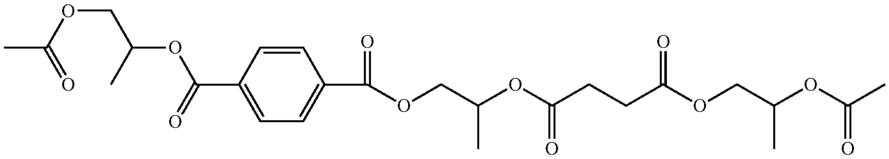
Mw: 510
B-18
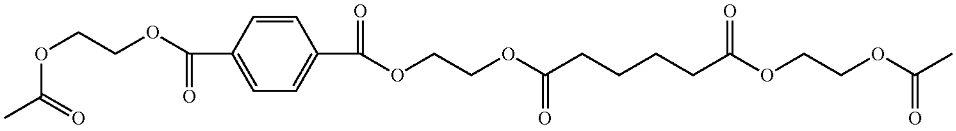
Mw: 525

-continued

B-19

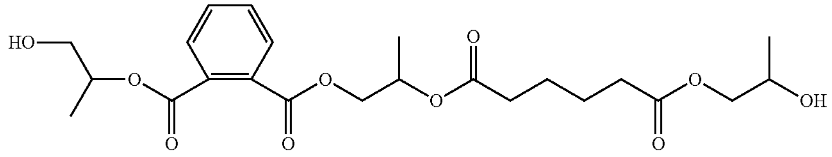

Mw: 437

The content of a retardation adjusting agent contained in the cellulose ester film used in the present invention is preferably 0.1-30% by mass, and specifically preferably 0.5-10% by mass based on the mass of the cellulose ester film.

The cellulose ester film of the present invention may contain a plasticizer if needed, in order to obtain the effect of the present invention.

The plasticizer is not specifically limited, however, it is preferably selected from, for example, a polycarboxylic acid ester plasticizer, a glycolate plasticizer, a phthalate plasticizer, a fatty acid ester plasticizer, a polyalcohol ester plasticizer, a polyester plasticizer and an acrylate plasticizer.

Of these, when two or more plasticizers are used, it is preferable that at least one is a polyalcohol ester plasticizer.

A polyalcohol ester plasticizer is a plasticizer which is constituted of an ester of an aliphatic polyalcohol of divalent or more and a monocarboxylic acid, and it preferably has an aromatic ring or a cycloalkyl ring in the molecule. It is preferably an ester of an aliphatic polyalcohol having a valence of 2-20.

The polyalcohol preferably used in the present invention is expressed by following Formula (a).

$R_1$—$(OH)n$ Formula (a)

wherein, $R_1$ represents an organic group having a valence of n, n represents an integer of two or more. The OH group means an alcoholic or a phenolic hydroxyl group.

As examples of a preferable polyalcohol, for example, the following compounds may be listed.

Examples of a preferable polyalcohol include: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

Specifically, triethylene glycol, tetraethylene glycol, dipropylene glycol, tripropylene sorbitol, trimethylol propane and xylitol are preferable.

The monocarboxylic acid to be used in the polyalcohol ester is not specifically limited, and a known aliphatic monocarboxylic acid, an alicyclic monocarboxylic acid and an aromatic monocarboxylic acid may be employed. Specifically, an aliphatic monocarboxylic acid and an aromatic monocarboxylic acid are preferable, since moisture permeation is reduced and retainability is improved.

The carboxylic acid to be employed in the polyalcohol ester may be one kind or a mixture of two or more kinds of them. The OH groups in the polyhydric alcohol may be fully esterified or a part of OH groups may be left unreacted.

Concrete compounds of a polyalcohol ester will be exemplified below.

1

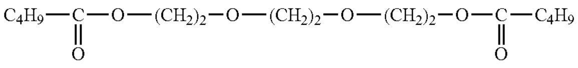

2

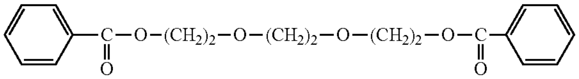

3

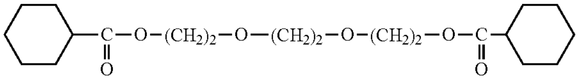

4

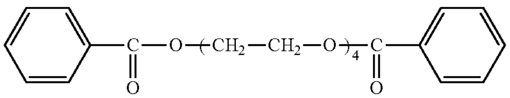

5

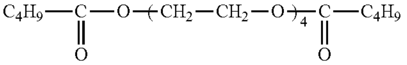

6

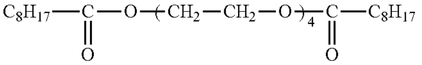

7

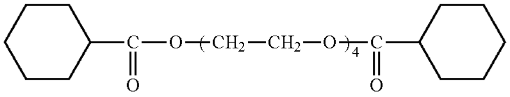

8

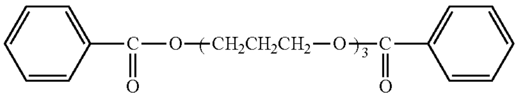

9

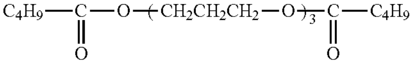

10

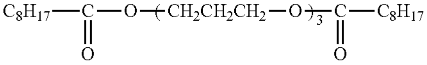

11

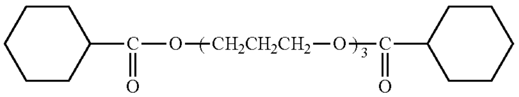

-continued
12
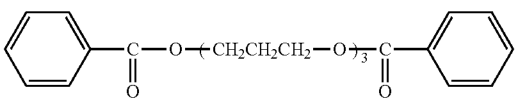
13
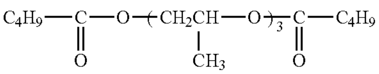
14
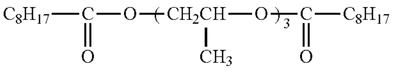
15
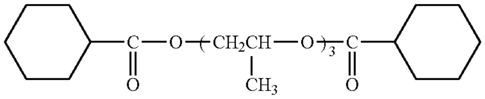
16
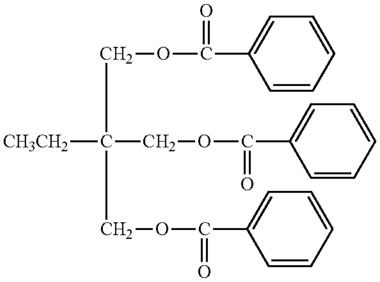
17
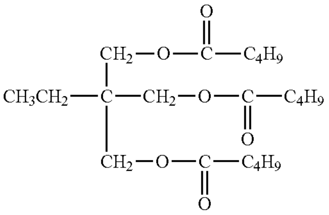
18
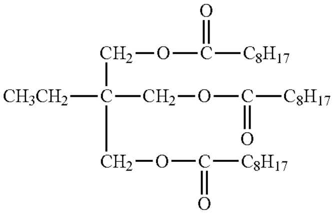
19
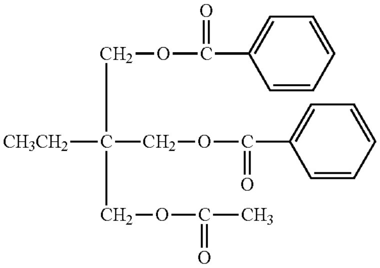
-continued
20
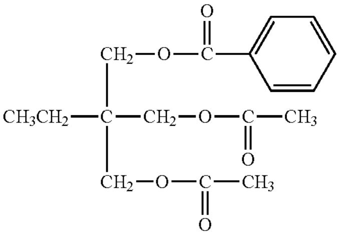
21
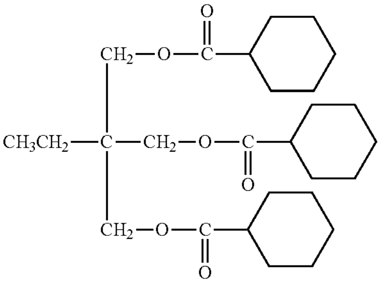
22
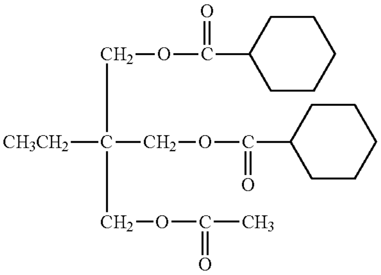
23
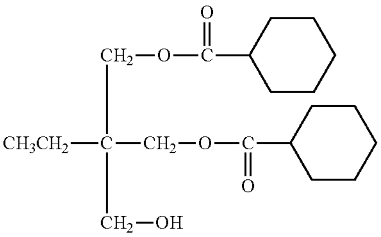
24
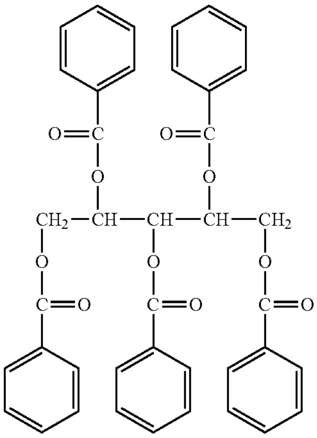

-continued
25
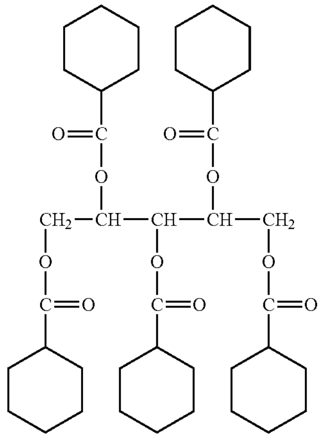
26
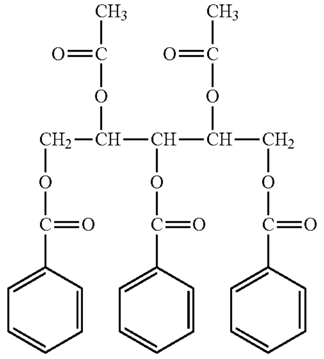
27
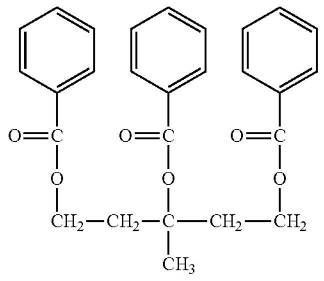
28
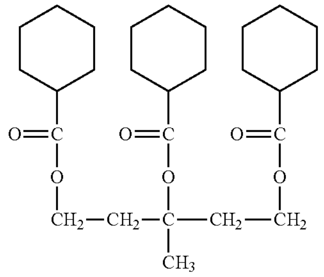
-continued
29
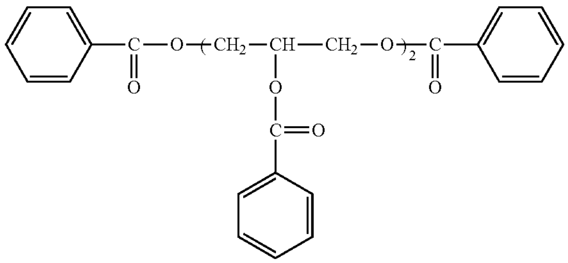
30
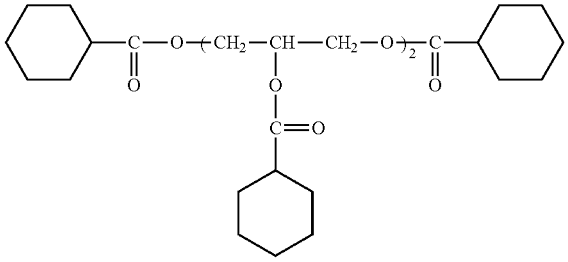
31
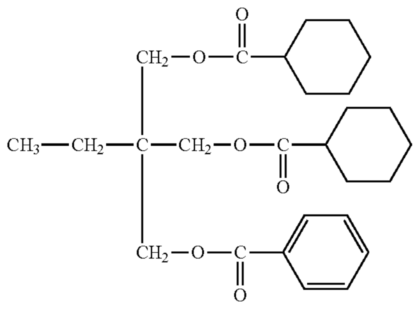
32
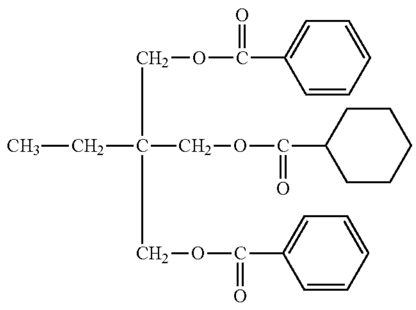
33
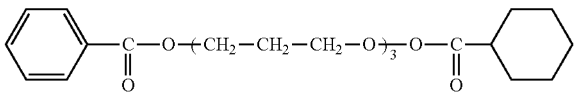
34
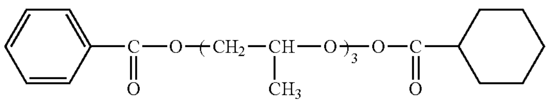

-continued

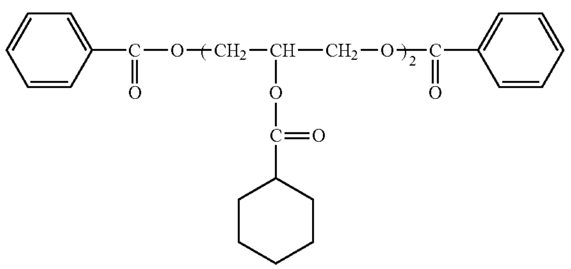

A glycolate type plasticizer is not specifically limited; however alkyl phthalyl alkyl glycolates may be preferably utilized.

Alkyl phthalyl alkyl glycolates include such as methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate and octyl phthalyl ethyl glycolate.

Examples of a phthalic acid ester plasticizer include such as diethyl phthalate, dimethoxy ethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

Examples of a citric acid ester plasticizer include such as acetyl trimethyl citrate, acetyl triethyl citrate and acetyl tributyl citrate.

Examples of a fatty acid ester type plasticizer include such as butyl oleate, methyl acetyl ricinoleate and dibutyl cebacate.

Examples of a phosphoric acid ester plasticizer include such as triphenyl phosphate, tricresyl phosphate, cresyl diphenyl phosphate, octyl diphenyl phosphate, diphenyl biphenyl phosphate, trioctyl phosphate and tributyl phosphate.

The polycarboxylic acid ester plasticizer usable in the present invention includes an ester of alcohol and a polycarboxylic acid having a valence of 2 or more, but preferably having a valence of 2-20. The valence of an aliphatic polycarboxylic acid is preferably 2-20, and the valence of an aromatic polycarboxylic acid and an alicyclic polycarboxylic acid each are preferably 3-20.

The polycarboxylic acid is expressed by Formula, (b).

$$R_2(COOH)_m(OH)_n \quad \text{Formula (b)}$$

(wherein, $R_2$ represents an organic group having a valence of (m+n), m is a positive integer of two or more, and n is an integer of zero or more, COOH group represents a carboxyl group and OH group represents alcoholic or phenolic hydroxyl group.)

The molecular weight of the monocarboxylic acid ester compound is not specifically limited, however, the molecular weight is preferably from 300 to 1000 and more preferably from 350 to 750. A higher molecular weight is preferable with respect to the improvement in retention properties, while a lower molecular weight is preferable with respect to reducing moisture permeability, or to improving compatibility with cellulose ester.

The alcohol used for the polycarboxylic acid ester used for the present invention may be one kind, or a mixture of two or more kinds.

The acid value of a polycarboxylic acid ester compound used for the present invention is preferably 1 mgKOH/g or less, and more preferably 0.2 mgKOH/g or less. The acid value in the above range is preferable because the variation of retardation values due to environmental change can be suppressed.

"Acid value", as described herein, refers to the amount of potassium hydroxide in mg, which is necessary to neutralize the acid (namely a carboxyl group existing in the sample) incorporated in 1 g of a sample. The acid value is determined based on MS K0070.

For example, listed are: triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyltartrate, diacetyldibutyl tartarate, tributyl trimellitate and tetrabutyl pyromellitate.

(Ultraviolet Absorber)

An ultraviolet absorber is aimed to improve durability by absorbing ultraviolet rays not longer than 400 nm. Specifically, the transmittance of light at a wavelength of 370 nm is 10% or less, more preferably 5% or less, and further more preferably 2% or less.

The ultraviolet absorber utilized in the present invention is not specifically limited and includes such as an oxybenzophnone compound, a benzotriazole compound, a sarycic acid ester compound, a benzophenone compound, a cyanoacrylate compound, a triazine compound, a nickel complex salt compound and an inorganic powder.

For example listed are 5-chloro-2-(3,5-di-sec-butyl-2-hydroxylphenyl)-2H-benzotnazole, (2-2H-benzotriazole-2-yl)-6-(straight chain and branched dodecyl)-4-methylpherrol, 2-hydroxy-4-benzyloxybenzophenone and 2,4-benzyloxybenzophenone; and also listed and preferably utilized are Tinuvins, such as Tinuvin 109, Tinuvin 171, Tinuvin 234, Tinuvin 326, Tinuvin 327 and Tinuvin 328, which are available on the market from Ciba Japan K. K.

Ultraviolet absorbers utilized in the present invention are preferably a benzotriazole ultraviolet absorber, a benzophenone ultraviolet absorber and a triazine t ultraviolet absorber, and specifically preferably a benzotriazole ultraviolet absorber and a benzophenone ultraviolet absorber.

In addition to these, a disc form compound such as a compound having a 1,3,5-triazine ring is preferably utilized as a UV absorber.

The polarizing plate protective film according to the present invention preferably contains two or more kinds of ultraviolet absorbers.

Further, a polymer ultraviolet absorber may also be preferably utilized as an ultraviolet absorber, and polymer type ultraviolet absorbents described in JP-A 6-148430 are specifically preferably utilized.

As an addition method of an ultraviolet absorber, a ultraviolet absorber may be added into a dope after having been dissolved in an organic solvent, for example, alcohols such as methanol, ethanol and butanol; organic solvents such as methylenechloride, methyl acetate, acetone and dioxane; and a mixed solvent thereof, or may be directly added into a dope composition.

Those insoluble in an organic solvent; such as inorganic powder, will be added into a dope after having been dispersed in an organic solvent and cellulose ester by use of such as a dissolver or a sand mill.

The using amount of an ultraviolet absorber is not uniform depending on a type and a using condition of an ultraviolet absorbent, however, in the case of the dry layer thickness of polarizing plate protective film of 30 to 200 μm, it is preferably 0.5 to 10 mass % and more preferably 0.6 to 4 mass %, based on the mass of the polarizing plate protective film.

(Antioxidant)

An antioxidant is also called as a deterioration-preventing agent. When a liquid crystal display is stored in a high temperature-high humidity condition, the cellulose ester film may be deteriorated.

An antioxidant is preferably contained in the foregoing cellulose ester film since an antioxidant has a function to retard or prevent decomposition of the cellulose ester film due to, for example, halogen contained in the residual solvent in the cellulose ester film or a phosphoric acid contained in a phosphoric acid-containing plasticizer.

As an antioxidant, hindered phenol compounds are also preferably employed. Examples of a hindered phenol compound: 2,6-di-t-butyl-p-cresol, pentaerythityl-tetrakis[3-(3,5-di-t-butyl-4-hydroxyphenyl)propionate], triethylene glycol-bis[3-(3-t-butyl-5-methyl-4-hydroxyphenyl) propionate], 1,6-hexanediol-bis[3-(3,5-di-t-butyl-4-hydroxyphenyl)propionate], 2,4'-bis(n-octyl)-6-(4 hydroxy-3,5-di-t-butylanilino)-1,3,5-triazine, 2,2-thio-diethylene-bis[3-(3,5-t-butyl-4-hydroxyphenyl) propionate], octadecyl-3-(3,5-di-t-butyl-4-hydroxyphenyl)propionate, N,N'-hexamethylene-bis(3,5-di-t-butyl-4-hydroxy-4-hydroxy-hydrocinnamide), 1,3,5-trimethyl-2,4,6-tris(3,5-di-t-butyl-4-hydroxybenzyl)benzene and tris-(3,5-di-t-butyl-4-hydroxybenzyl)-isocyanurate.

Specifically, 2,6-di-t-butyl-p-cresol, pentaetythityl-tetrakis[3-(3,5-di-t-butyl-4-hydroxyphenyl)propionate] and triethylene glycol-bis[3-(3-t-butyl-5-methyl-4-hydroxyphenyl) propionate] are preferred. Further, a hydrazine metal inactivation agent such as N,N'-bis[3-(3,5-di-t-butyl-4-hydroxyphenyl)propionyl]hydrazine or a phosphorus-containing processing stabilizing agent such as tris(2,4-di-t-butylphenyl)phosphite may be used in combination.

The adding amount of such a compound is preferably 1 ppm to 1.0%, and more preferably from 10 ppm to 1,000 ppm by mass based on the mass of the cellulose derivative.

(Acid Scavengers)

At a relatively high temperature, decomposition of cellulose esters is also accelerated by the presence of acids. Accordingly, it is preferable that the optical film of the present invention contains an acid scavengers.

Acid scavengers in the present invention may be employed without any limitation, as long as they are compounds which react with acids to inactivate them. Of such compounds, preferred are compounds having an epoxy group, as described in U.S. Pat. No. 4,137,201. Epoxy compounds as such an acid scavenger are known in this technical field, and include diglycidyl ethers of various polyglycols, especially, polyglycols which are derived by condensation of ethylene oxides in an amount of around 8-40 mol per mol of polyglycol, metal epoxy compounds (for example, those which have conventionally been employed together with vinyl chloride polymer compositions in vinyl chloride polymer compositions), epoxidized ether condensation products, diglycidyl ethers (namely, 4,4'-dihydroxydiphenylciimethylrnetbane) of bisphenol A, epoxidized unsaturated fatty acid esters (particularly, alkyl esters (for example, butyl epoxystearate) having around 2-4 carbon atoms of fat acids having 2-22 carbon atoms), epoxidized plant oils which can be represented and exemplified by compositions of various epoxidized long chain fatty acid triglycerides (for example, epoxidized soybean oil and epoxidized linseed oil and other unsaturated natural oils (these are occasionally called epoxidized natural glycerides or unsaturated fatty acid and these fatty acid have 12-22 carbon atoms). Further, preferably employed as commercially available epoxy group incorporating epoxide resinous compounds may be EPSON 815C.

Examples of other usable acid scavenger include an oxetane compound, an oxazoline compound, an organic acid salt of an alkaline earth metal, an acetylacetonato complex and those described in paragraphs 68-105 of JP-A No. 5-194788.

Further, acid scavengers may also be called acid trapping agent and acid catchers, but in the present invention, it is possible to use them regardless name.

(Particles)

Particles are preferably used in the cellulose ester film of the present invention in order to provide lubrication.

The average particle diameter of the primary particles is preferably not more than 20 nm, more preferably 5-16 nm, and still more preferably 5-12 nm.

The particles are preferably incorporated in the retardation film with forming secondary particles with the particle diameter of 0.1-5 μm. The particle diameter is more preferably 0.1-2 μm and still more preferably 0.2-0.6 μm. By incorporating such particles, asperity with the height of 0.1-1.0 μm is formed on the surface of the film, whereby preferable lubrication is provided on the surface of the film.

In order to measure the average diameter of the primary particles utilized in the present invention, the particles were observed employing a transmission electron microscope (at a magnification of 500,000-2,000,000 times) to determine the primary average particle diameter as an average value via observation of 100 particles.

The apparent specific gravity of particles is preferably at least 70 g/liter, more preferably 90-200 g/liter and specifically preferably 100-200 g/liter. The larger is the apparent specific gravity, dispersion having the higher concentration can be prepared, which is preferable because of improved haze and less aggregation, and is specifically preferable during preparation of a dope having a high solid content as used in the present invention.

The addition amount of silicon dioxide particles in the cellulose ester is preferably 0.01-5.0 parts by mass, more preferably 0.05-1.0 parts by mass and most preferably 0.1-0.5 part by mass in 100 parts by mass of cellulose ester. The larger addition amount results in a superior dynamic friction factor of a cellulose ester film is, while the smaller addition amount results in lower haze and a smaller amount of aggregation.

In order to obtain a high lubricant and low haze film, preferable is to cast a dope so that the dope containing particles is directly in contact with the support for casting.

After a dope is cast, peeled from the support, dried and wound in a roll, a function layer, for example, a hard coat layer or an antireflection layer, may be provided on the formed film. Before the film is further treated or shipped, the film is usually packaged in order to protect the film from stain or attachment of dust due to static electricity.

The material for package is not specifically limited, as far as the above object is achieved, however, preferable is a film which does not prevent evaporation of a residual solvent. Specifically, preferably used are, for example, polyethylene, polyester, polypropylene, nylon, polystyrene, paper and various non-woven clothes. A fiber mesh cloth is more preferably employed.

(Manufacturing Method of Cellulose Ester Film)

Next, the manufacturing method of the cellulose ester film used in the present invention will be explained.

In the present invention, any of a cellulose ester film manufactured via a solution casting method or a cellulose ester film manufactured via a melt casting method may be preferably used.

Manufacturing of the cellulose ester film of the present invention may be performed by a process to dissolve cellulose ester and additives in a solvent to prepare a dope, a process to cast the dope on an endlessly running endless metal support, a process to dry the cast dope to make a web, a process to peel the web from the metal support, a process to stretch the web or to hold the width, a process to further dry the web, and a process to wind up the finished film.

A process to prepare a dope will be now described. The concentration of cellulose ester in a dope is preferably the higher with respect to decreasing a drying load after the dope has been east on a metal support, while filtering precision will be deteriorated due to an increased load at the time of filtering when the concentration of cellulose ester is excessively high. The concentration to balance these is preferably 10-35% by mass and more preferably 15-25% by mass.

A solvent utilized in a dope of the present invention, one type alone or at least two types in combination may be utilized, however, a good solvent and a poor solvent for cellulose ester are preferably utilized in combination with respect to manufacturing efficiency. A larger amount of a good solvent is preferable with respect to the dissolution of cellulose ester.

A preferable range of a mixing ratio of a good solvent to a poor solvent is 70-98% by mass of good solvent to 2-30% by mass of a poor solvent. As a good solvent and a poor solvent, one dissolves the cellulose ester by itself alone is defined as a good solvent and one swells or can not dissolve the cellulose ester alone is defined as a poor solvent.

A good solvent utilized in the present invention is not specifically limited, however, includes an organic halogen compound such as methylene chloride, dioxoranes, acetone, methylacetate and methyl acetoacetate. Methylene chloride and methyl acetate are specifically preferable.

Further, a poor solvent utilized in the present invention is not specifically limited, however, such as methanol, ethanol, n-butanol, cyclohexane and cyclohexanone are preferably utilized. Further, a dope is preferably contains 0.01-2% by mass of water.

The solvent removed from the film by drying in the film forming process is recovered and reused as the solvent used for dissolving a cellulose ester.

In the recovered solvent, a small amount of for example, a plasticizer, a UV absorber, a polymer component or a monomer component may be contained. The solvent can be preferably used even when these materials are contained, or, alternatively, the solvent may be purified, if necessary, to reuse.

As a dissolution method of cellulose ester at the time of preparation of the dope described above, a general method can be employed. By a combination of heating and increased pressure, it is possible to heat up to a temperature higher than the boiling point of the solvent under an ordinary pressure.

It is preferable to dissolve the cellulose ester while stirring by heating up to a temperature higher than the boiling point of the solvent under an ordinary pressure but in the temperature range in which the solvent does not boil under the increased pressure, because generation of a granular insoluble residue, which is called as gel or flocculates, is prevented.

Further, preferably utilized is a method, in which cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside, and for example, jacket type equipment is preferable with respect to easy temperature control.

Heating temperature with addition of a solvent is preferably the higher in view of solubility of cellulose ester; however, productivity may be deteriorated due to increase of a required pressure when the heating temperature is excessively high.

The heating temperature is preferably 45-120° C. more preferably 60-110° C. and furthermore preferably 70-105° C. Further, the pressure is adjusted not to boil a solvent at the set temperature.

In addition to these, a cold dissolution method is also preferably applied, and cellulose ester can be dissolved in such as methyl acetate by this method.

Next, this cellulose ester solution is filtered by use of a suitable filter medium such as filter paper. As a filter medium, the absolute filtering precision is preferably the smaller to eliminate insoluble residue, however, there is a problem of easy clogging of a filter medium when the absolute filtering precision is excessively small.

Therefore, the absolute filtering precision of a filter medium is preferably not larger than 0.008 mm, more preferably 0.001-0.008 mm and furthermore preferably 0.003-0.006 mm.

The material of a filter medium is not specifically limited and an ordinary filter medium can be utilized, however, a filter medium made of plastic such as polypropylene and Teflon (a registered trade mark) and a filter medium made of metal such as stainless steel are preferable because of such as no release of fiber of a filter medium.

It is preferable to eliminate and reduce impurities and particularly foreign matter causing a bright spot defect, having been contained in cellulose ester as a raw material, by filtration.

Foreign matter causing bright spot defects means a spot (foreign matter) which is visible due to light leak, when two sheets of polarizing plates, between which an optical film is placed, are arranged in a crossed nicols state, and light is irradiated from one of the polarizing plate side to be observed from the other polarizing plate side. The number of bright spots having a diameter of not less than 0.01 mm is preferably not more than 200 spots/$cm^2$.

The number of bright spots having a diameter of not less than 0.01 mm is more preferably not more than 100 spots/$cm^2$, further more preferably not more than 50 spots/$cm^2$, still more preferably 0-10 spots/$cm^2$. Further, the number of a bright spot defect of not larger than 0.01 mm is also preferably the manlier.

Filtering of a dope can be performed by an ordinary method, however, a method to filter while heating at a temperature of not lower than a boiling point of a solvent at ordinary pressure and of not to boil the solvent under an increased pressure is preferable because of small increase of a difference of filter pressures between before and after filtering (referred to as a pressure difference).

The preferable temperature is 45-120° C., more preferably 45-70° C. and furthermore preferably 45-55° C.

Filter pressure is preferably the lower. The filter pressure is preferably not higher than 1.6 MPa, more preferably not higher than 12 MPa and furthermore preferably not higher than 1.0 MPa.

Casting of a dope will now be explained.

A metal support in a casting process is preferably those the surface of which is mirror finished, and a stainless steel belt or a drum made of castings, the surface of which is plating finished, is utilized.

The cast width can be set to 1-4 m. The surface temperature of a metal support in a cast process is from −50° C. to a temperature lower than the boiling point of a solvent. It is preferable the temperature is the higher since a drying speed of a web can be set faster; however, excessively high temperature may sometimes cause foaming of a web or deterioration of flatness.

The support temperature is preferably 0-55° C. and more preferably 25-50° C. It is also a preferable method to make a web gelled by cooling and to peel off the web from a drum while the web contains a larger amount of residual solvent.

The method to control the temperature of a metal support is not specifically limited; however, there are a method to blow a hot wind or a cold wind on the web and a method to make hot water contact the rear side of a metal plate. A method to utilize hot water is preferable because time required to make a metal support become a constant temperature is short due to more efficient heat conduction. In the case of employing a hot wind, a wind of a temperature higher than the aimed temperature may be employed.

To provide a good flatness of a cellulose ester film, the residual solvent amount at the time of peeling off a web from a metal support is preferably 10-150 mass %, more preferably 20-40 mass % or 60-130 mass % and specifically preferably 20-30 mass % or 70-120 mass %.

In the present invention, a residual solvent amount is defined by the following equation.

$$\text{Residual solvent amount (mass \%)}=\{(M-N)/N\}\times 100$$

Herein, M is a weight of a sample picked at an arbitrary time during or after manufacturing of a web or film and N is a weight after heating M at 115° C. for 1 hour.

Further, in a drying process of a cellulose ester film, a web is preferably peeled off from a metal support and further dried to make a residual solvent amount of not more than 1 mass %, more preferably not more than 0.1 mass % and specifically preferably 0-0.01 mass %.

In a film drying process, a roll drying method (in which a web is dried while being alternately passed through many rolls which are arranged up and down) or a method to dry a web while being transported by a tenter method will be applied.

To prepare cellulose ester film used in the present invention, it is specifically preferable that a web is stretched in the width direction (the lateral direction) by means of a tenter method to grip the both edges of the web by such as clips. The peeling tension is preferably 300 N/m or less.

A means to dry a web is not specifically limited, and it can be generally performed by such as a hot wind, infrared rays, a heat roll and microwaves, however, preferably performed by a hot wind in view of convenience.

A drying temperature in a drying process of a web is preferably raised step-wise in a range of 40-200° C.

The layer thickness of the cellulose ester film is not specifically limited; however, a layer thickness of 10 to 200 μm is applied. The layer thickness is specifically preferably 10-100 μm and furthermore preferably 20 to 60 μm.

The cellulose ester film of the present invention has a width of 1 to 4 m. The width is preferably 1.4 to 4 m and specifically preferably 1.6 to 3 m. When the width exceeds 4 m, the transportation becomes difficult.

In order to obtain the retardation values Ro and Rt desired in the present invention, it is preferable that the cellulose ester film has the constitution of the present invention and, further, is subjected to refractive index control by means of control of conveyance tension or stretching.

The retardation value can be varied by increasing or decreasing the tension along the longitudinal direction.

It is also possible to perform uniaxial stretching or sequential or simultaneous biaxial stretching in the longitudinal direction of the film (the cast direction) and in the direction perpendicular thereto in the film plane, namely, in the width direction.

The stretching ratios in the biaxial directions perpendicular to each other are preferably set to finally 0.8 to 1.5 times in the cast direction and 1.1 to 2.5 times in the width direction, and more preferably set to 0.8 to 1.0 times in the east direction and 1.2 to 2.0 times in the width direction.

The stretching temperature is preferably 120° C. to 200° C., more preferably 150° C. to 200° C., still more preferably higher than 150° C. and not higher than 190° C.

It may be preferable to stretch a film under the condition where the content of the residual solvent in the film is 20 to 0%, and more preferably 15 to 0%.

More concretely, the film is preferably stretched under the condition that the content of the residual solvent is 11% at 155° C., or the content of the residual solvent is 2% at 155° C. Otherwise, the content of the residual solvent is 11% at 160° C., or the content of the residual solvent is lower than 1% at 160° C.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edges of a web with clips or pins and widening the intervals between clips and pins toward the proceeding direction, a method to stretch by widening similarly along the width direction, or a method to stretch in the both of longitudinal and width directions by simultaneously widening along the longitudinal and width directions. Of course, these methods may be used in combination.

In a so-called tenter method, it is preferable that a smooth stretching can be performed by driving the clip portion by a linear drive method which reduces risk to such as break.

It is preferable to perform the width holding or stretching in the width direction by a tenter, which may be either a pin tenter or a clip tenter.

The slow axis or the fast axis of the cellulose ester film of the present invention preferably is present in a film plane and θ1 is preferably not less than −1° and not more than +1°, more preferably not less than −0.5° and not more than +0.5°, and still more preferably not less than −0.1° and not more than +0.1°, provided that θ1 represents the angle against the casting direction.

This θ1 can be defined as an orientation angle, and measurement of θ1 can be performed by use of automatic birefringent meter KOBRA-21ADH (Oji Scientific Instruments). To satisfy the above-described relationships by θ1 can contributes to obtain a high luminance and to restrain or prevent light leak, and to obtain faithful color reproduction in a color liquid display.

<Physical Properties of Cellulose Ester Film>

The moisture permeability of the cellulose ester film according to the present invention is preferably 300 to 1,800 $g/m^2 \cdot 24$ h, more preferably 400 to 1,500 $g/m^2 \cdot 24$ h and specifically preferably 400 to 1300 $g/m^2 \cdot 24$ h at 40° C., 90% RH. The moisture permeability can be measured according to a method described in JIS Z 0208.

The elongation percentage of the cellulose ester film according to the present invention is preferably 5 to 80% and more preferably 10 to 50%.

The visible light transmittance of the cellulose ester film according to the present invention is preferably not less than 90% and more preferably not less than 93%.

Further, if a liquid crystal layer is coated on the cellulose ester film according to the present invention, retardation values extending over a more wide range may be obtained.

The in-plane retardation value (Ro) and the retardation value in the thickness direction (Rt) of the cellulose ester film used in the present invention are preferably 0≤Ro, Rt≤70 nm, more preferably 0≤Ro≤30 nm and 0≤Rt≤50 nm, and still more preferably 0≤Ro≤10 nm and 0≤Rt≤30 nm, when the cellulose ester film is used as a polarizing plate protective film.

The cellulose ester film used in the present invention is preferably used as a retardation film. In that case, the retardation values are 30≤Ro≤100 nm and 70≤Rt≤400 nm, and more preferably 35≤Ro≤65 nm and 90≤Rt≤180 nm. The variation and distribution of Rt is preferably less than ±50%, more preferably less than ±30% and still more preferably less than ±20%. Further, it is preferably less than +15%, more preferably less than ±10%, more preferably less than ±5%, and specifically preferably less than ±1%. Most preferable is that there is no variation in the Rt value.

Retardation values Ro and Rt can be obtained according to the following Formulae.

$$Ro=(n_x-n_y)\times d$$

$$Rt=\{(n_x+n_y)/2-n_z\}\times d$$

wherein d represents a thickness (nm) of the film, refractive index $n_x$ (reefs active index in the slow axis direction), $n_y$ (refractive index in the direction perpendicular to the slow axis direction in the film plane), $n_z$ (refractive index of the film in the thickness direction)

Retardation values (Ro) and (Rt) were determined at a wavelength of 590 nm using an automatic birefringent meter KOBRA-21ADH produced by Oji Scientific Instruments at 23° C. under 55% RH.

<Hydrophilic Treatment of Surface>

The polarizing plate of the present invention is characterized in that it is a polarizing plate containing a polarizer sandwiched between protective films of which at least one protective film is subjected to a hydrophilic treatment via a plasma treatment or a corona treatment, As the methods of the plasma treatment and the corona treatment, those well known in the art are applicable. In the present invention, it is specifically preferable that a plasma treatment is used.

<Plasma Treatment>

A plasma treatment, specifically an atmospheric pressure plasma treatment, applicable to a hydrophilic surface treatment of the polarizing plate protective film according to the present invention will be explained below.

As examples of a plasma treatment applicable to the present invention, technologies disclosed in, for example, JP-A No. 11-133205, 2000-185362, 11-61406, 2000-147209 or 2000-121804 may be cited.

An atmospheric pressure plasma treatment method used in the present invention will be explained.

First, an atmospheric pressure plasma treatment method and an equipment thereof, effectively used in the present invention, will be explained.

In the plasma treatment method according to the present invention, a surface treatment is carried out by, under an atmospheric pressure or a near atmospheric pressure, by supplying gas to an electric discharge space (namely, between opposed electrodes), applying a high frequency voltage to the discharge space to generate a plasma state by exciting the gas, and exposing a polarizing plate protective film to the excited gas in a plasma state. This method is called an atmospheric pressure plasma treatment method (hereafter, it may also be referred to as a plasma treatment). The plasma irradiation include a case in which the surface of a polarizing plate protective film is directly exposed to a plasma state, and a case in which excited active species formed by plasma discharging is sprayed onto the surface a polarizing plate protective film. The high frequency voltage applied to the discharge space formed between opposed electrodes may be a high frequency wave of one frequency, or may be a high frequency wave of frequencies of two or more. The high frequency wave as used in the present invention means one having a frequency of 0.5 kHz or more. It is preferable in the present invention that the frequency of a high frequency power supply is 50 kHz or more and 27 MHz or less.

In the present invention, an atmospheric pressure plasma treatment is performed under an atmospheric pressure or a near atmospheric pressure, where an atmospheric pressure or a near atmospheric pressure is about 20-110 kPa. In order to acquire the excellent effect as mentioned in the present invention, an atmospheric pressure or a near atmospheric pressure is preferably 93-104 kPa.

In the present invention, applicable examples of the gas supplied to the space between the opposed electrodes (namely, the discharge space) include nitrogen, hydrogen, argon, helium, carbon monoxide and ammonia. It is preferable that 50% by volume or more of nitrogen is contained in the gas in view of the cost.

The atmospheric pressure plasma treatment is used for a surface treatment in the present invention. Also, a thin film forming gas may be contained in the gas, in which the gas contains an exciting gas which is excited with a high frequency voltage and a thin film forming gas which is brought into a plasma state or an excited state by receiving the energy of the exciting gas excited with a high frequency voltage, whereby a thin film is formed.

Although it is possible that the duration of plasma irradiation is made longer than 3 seconds to lower the water contact angle by increasing the energy of plasma injection, this is not preferred because heat damage to a substrate film may occur due to the increased plasma energy.

On the contrary, when the duration of plasma irradiation is made 3 seconds or less, the damage to a substrate film is suppressed, however, the adherence between the polarizing plate protective film and the polarizer becomes insufficient, whereby an alkali saponification processing becomes indispensable after plasma treatment (refer to JP-A No. 2009-25603 patent bulletin).

When processing with a high frequency voltage having one frequency (which may also be called as 1 frequency high-frequency-voltage applying method), or when processing with a high frequency voltage having two frequencies (which may be called as 2 frequency high-frequency-voltage applying method), exactly the same electrode can be used and there is no big difference in the equipment itself.

Different points are that there are two high frequency power supplies each accompanying a filter and that high frequency voltages are applied from both of the opposing electrodes.

In the case of 1 frequency high-frequency-voltage applying method which is useful to the present invention, one of the opposed electrodes is an earth electrode and the other electrode is a voltage applying electrode, in which a high frequency power supply is connected to the voltage applying electrode and the earth electrode is grounded.

The plasma treatment equipment (also referred to as the atmospheric pressure plasma treatment equipment) of each 1 frequency high-frequency-voltage applying method and 2 frequency high-frequency-voltage applying method will be explained using a diagram.

FIG. 1 is a schematic view illustrating an example of the plasma treatment equipment of 1 frequency high-frequency-voltage applying method useful to the present invention.

The opposed electrodes are formed with voltage applying electrodes (which is a square tube-shaped electrode) 136 which are in the inside of the plasma discharge container 130 and apply a high frequency voltage, and a roll type earth electrode 135 which is beneath the voltage applying electrodes 136 and conveys a transparent resin film F while twisting the transparent resin film F around the roll type earth electrode 135. The number of the voltage applying electrodes 136 is not limited. Gas G is supplied from the gas supply port 152 of the plasma discharge container 10, passes through a mesh which homogenizes Gas G, passes between the voltage applying electrodes 136 as well as along the inner walls of the voltage applying electrodes and the plasma discharge container 131 and fills the discharge space 13 between the opposed electrodes. A high frequency voltage is applied to the voltage applying electrodes 136 using a high frequency power supply 21, a transparent resin film F is exposed to the gas G excited in the electric discharge space 132, and a thin film is formed on the transparent resin film F. The frequency range of the applied high frequency voltage is 50 kHz-150 MHz. It is preferable in the present invention that the frequency of the high frequency power supply is 50 kHz or more and 27 MHz or less.

If the frequency is less than 50 kHz, no effect of the present invention can be obtained, or if the frequency exceeds 150 MHz, a complicated facility becomes necessary since formation of discharge becomes difficult and a large area treatment becomes difficult because the treatment becomes non-uniform due to occurrence of potential distribution, whereby not suitable in the present invention.

During the thin film formation, the electrodes are heated or cooled by the electrode temperature control device 160 through the pipe arrangement. It is preferable to suitably control the temperature of the electrodes because the physical properties and the composition are varied sometimes according to the temperature of the substrate on the occasion of the plasma discharge treatment. As the medium for temperature control, an insulation material such as distilled water and oil is preferably used. It is desired that the temperature at the interior of the electrode is uniformly controlled so that ununiformity of temperature in the width direction and length direction of the substrate is made as small as possible on the occasion of the plasma discharge treatment.

Figure 2:
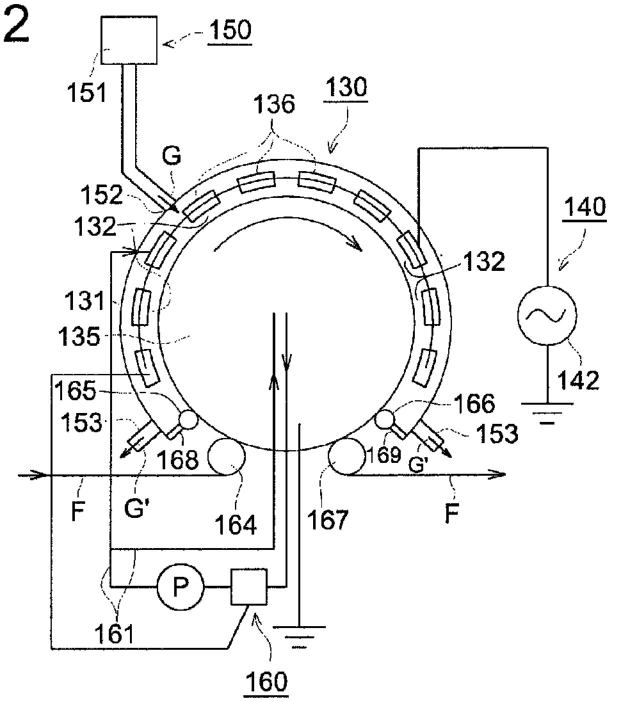
FIG. 2 is a schematic illustration of an example of a plasma treatment device of 1 frequency high frequency voltage applying type.

FIG. 2 is a schematic illustration of an example of a plasma treatment device of 2 frequency high frequency voltage applying type which is useful in the present invention. As the same as in FIG. 1, transparent film F is plasma treated in between the opposed electrodes of the roll electrode (the first electrode) 135 and the rectangular tube-shaped electrode (the second electrode) 136 (namely, in a discharge space).

In the discharging space 132 (between the opposed electrodes) formed between the roll electrode (the first electrode) 135 and the rectangular tube-shaped electrode group (the second electrode) 136, the first high frequency electric field with frequency $\omega_1$ and electric field strength $V_1$ from the first power source 141 is applied to the roll electrode (the first electrode) 135, and a second high frequency electric field with frequency $\omega_2$ and electric field strength $V_2$ from the second power source 142 is applied to the rectangular tube-shaped electrode (the second electrode) 136.

The first filter 143 is provided between the roll electrode (the first electrode) 135 and the first power source 141 so that the electric current from the first power source 141 to the first electrode is easily passed, and the first filter 143 is designed so that the electric current from the first power source 141 is difficultly passed while the electric current from the second power source 142 is easily passed. The second filter 144 is provided between the rectangular tube-shaped electrode group (the second electrode) 136 and the second power source 142 so that the electric current from the second power source 142 to the second electrode is easily passed, and the second filter 144 is designed so that the electric current from the second power source 142 is difficultly passed while the electric current from the first power source 141 is easily passed. Here, the current is difficultly passed means that preferably only 20% or less and more preferably only 10% or less of the current is passed. On the contrary, the current is easily passed means that preferably 80% or more and more preferably 90% or more of the current is passed.

In the present invention, any filter is applicable as far as the filter exhibits an aforementioned property. For example, as the first filter, a capacitor of several tens pF to several tens of thousands pH or a coil of several μH may be used according to the frequency of the second electrode. As the second filter, a coil of 10 μm or more according to the frequency of the first electrode may be used. These capacitor and coil can be used as a filter by grounding through the capacitor or the coil.

In the present invention, it is also possible to use the roll electrode 135 as the second electrode and the rectangular tube-shaped electrode 136 as the first electrode. In all cases, the first power source is connected to the first electrode and the second power source is connected to the second electrode. The first electrode preferably supplies high frequency electric field strength larger than that of the second power source ($V_1>V_2$). The frequency can be $\omega_1<\omega_2$.

Gas G generated by a gas generating apparatus 151 of the gas generating device 150 is controlled in the flowing amount and introduced into a plasma discharge treatment vessel 131 through a gas supplying opening 152. The discharge space 132 and discharge treatment vessel 131 are filled with gas G.

The transparent film F is unwound from a bulk roll not shown in the drawing or conveyed from a previous process and introduced into the apparatus trough a guide roll 164. Air accompanied with the substrate is blocked by a nip roll 165. The transparent film is conveyed into the space between the rectangular tube-shaped electrode group 136 and the roller electrode (first electrode) 135 while contacting and putting round with the roll electrode 135. Then the electric field is applied by both of the roll electrode (the first electrode) 135 and the rectangular tube-shaped electrode group (the second electrode) 136 for generating discharging plasma in the space 132 (discharging space) between the opposed electrodes. The gas in the plasma state is applied on the transparent film F while contacting and putting round with the roll electrode 135. After that the transparent film F is wound up by a winder not shown in the drawing or transported to a next process through a nip roll 166 and a guide roll 167. The exhaust gas G' after the treatment is discharged from an exhaust opening 153.

For cooling or heating the roll electrode (the first electrode) 135 and the rectangular tube-shaped electrode group (the second electrode) 136 during the plasma treatment, a medium controlled in the temperature by an electrode temperature controlling means 160 is sent to the both electrodes by a liquid sending pump P through pipe arrangement 161 to control the temperature of the electrodes horn the interior thereof. The numbers 165 and 166 are partition plates fear separating the plasma discharging treatment vessel 131 from the outside.

In the present invention, the applied high frequency voltage may be an intermittent pulse wave or a continuous sign wave, and the wave form is not limited. However, a sign wave is preferable to apply a high power high frequency voltage to form a rigid thin film.

In the present invention, the frequency of a high frequency voltage applied to the first electrode is preferably 1 kHz-200 kHz, and the frequency of a high frequency voltage applied to the second electrode is preferably 800 kHz or more.

The power density in such a case is preferably 1-50 W/$cm^2$ (the "$cm^2$" in the denominator means the area where discharge is conducted) and more preferably 1.2-30 W/$cm^2$.

Examples of a high frequency power source effective for the plasma treatment apparatus used in the present invention include 100 kHz* (produced by Haiden laboratory), and 200 kHz, 800 kHz, 1 MHz, 13.55 MHz, 27 NHz and 150 MHz (all of these produced by Pearl Kogyo Co., Ltd.) The power supply marked * is an impulse high frequency power supply of Haiden Laboratory (100 kHz in continuous mode)

In the present invention, electrodes which enable to keep a uniform glow discharge state when such a voltage is applied, as will be described below, must be adopted in a plasma treatment apparatus.

Figure 3:
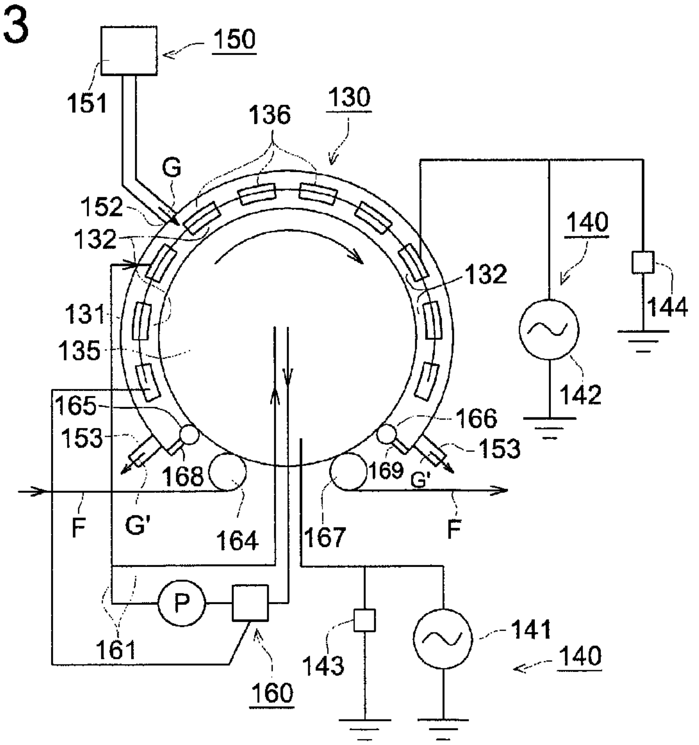
FIG. 3 is a schematic illustration of an example of a plasma treatment device of 2 frequency high frequency voltage applying type.

FIG. 3 shows a perspective view showing an example of a structure having a conductive base metal and a dielectric which covers the base metal of a roll electrode.

In FIG. 3, roll electrode **35*a* is composed of an electroconductive metal base 35A having a cover of dielectric material 35**B and the inside of the electrode is hollow, whereby forming a jacket, so that the temperature can be controlled during the discharging.

Figure 4:
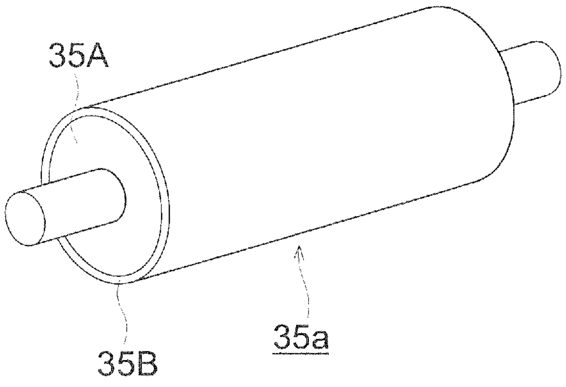
FIG. 4 is a perspective view showing an example of a structure having a conductive base metal and a dielectric which covers the base metal of a roll electrode.
Figure 5:
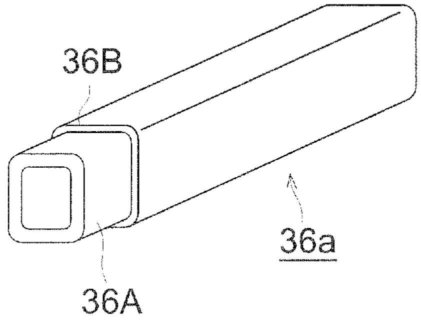
FIG. 5 is a perspective view showing an example of a structure having a conductive base metal and a dielectric which covers the base metal of rectangular tube-type electrode.

FIG. 4 shows a perspective view showing an example of a structure having a conductive base metal and a dielectric which covers the base metal of a rectangular tube-shaped electrode illustrated in FIGS. 1 and 2.

In FIG. 4, rectangular tube-shaped electrode **36*a* is composed of an electroconductive metal base 36A having a cover of dielectric material 36B as same as shown in FIG. 3** and the electrode constitutes a metal pipe forming a jacket so that the temperature can be controlled during the discharging.

The plural rectangular tube-shaped electrodes are arranged along the circumstance larger than that of the roll electrode and the discharging area of the electrode is expressed by the sum of the area of the surface of the rectangular tube-shaped electrodes facing the roll electrode 35.

The rectangular tube-shaped electrode **36*a*** may also be a cylindrical electrode but the rectangular tube-shaped electrode is preferably used in the present invention since the rectangular tube-shaped electrode is effective for increasing the discharging range (discharging area) compared with the cylindrical electrode.

The roller electrode **35*a* and the rectangular tube-shaped electrode 36*a* shown in FIGS. 3 and 4 are each prepared by thermal spraying ceramics as the dielectric material 35B or 36B on the metal base 35A or 35**B and subjecting to a sealing treatment using a an inorganic sealing material. The thickness of the ceramics dielectric material may be about 1 mm. As the ceramics material for the thermal spraying, alumina and silicon nitride are preferably used, among them alumina, which can be easily processed, is particularly preferred. The dielectric layer may be a lining treated dielectrics formed by lining an inorganic material.

For the electroconductive metal base material 35A and 36B, metals such as titanium and a titanium alloy, silver, platinum, stainless steel, aluminum and iron, a composite material of iron and ceramics and a composite material of aluminum and ceramics are usable and the metallic titanium and titanium alloy are particularly preferable by the later-mentioned reason.

The distance between two electrodes (namely, an electrode gap) is determined in consideration of for example, the thickness of the dielectric provided on the conductive base metal, the applied voltage, and the purpose to use the plasma. Each of the shortest distance between the dielectric surface and the conductive base metal surface in the ease when the dielectric is provided on only one of the electrodes, and the distance between the dielectric surfaces in the case when the dielectric is provided on both the electrodes is preferably 0.1-20 mm and more preferably 0.5-2 mm in view of conducting uniform discharge.

As the plasma treatment vessel 10 or 31, for example, a treatment vessel made of PyrexR glass is preferably used. A metallic vessel may also be used, provided that insulation with the electrode is assured. For example, a polyimide resin may be adhered in the inside of a frame made from aluminum or stainless steel. Also, a ceramic thermal spray may be conducted onto the metallic frame for insulation. In FIG. 1, the both sides of the parallel electrodes (up to near the base metal) are preferably covered with the aforementioned material.

With respect to the electrode used in the plasma treatment according to the present invention, the maximum height (Rmax) of the surface roughness specified by JIS B 0601 of the side which is in contact with the base metal is preferably adjusted to be 1 μm or less, in view of obtaining the effect described in the present invention. The maximum height of the surface roughness is more preferably adjusted to be 0.8 μm or less and specifically preferably adjusted to be 0.7 μm or less. Thus, by a method, for example, finishing the dielectric surface of the electrode covered with dielectric by polishing, the thickness of the dielectric and the gap between the electrodes can be kept constant whereby the discharge state is stabilized, and strain or crack according to a thermal contraction difference or remaining stress can be avoided, and the electrodes can be made highly precise and the durability can be greatly improved. The polish finishing of the surface of a dielectric is preferably carried out at least on the dielectric of the side which is in contact with the base metal. Further, the surface area increases and its adhesive property is improved when the central line average surface roughness (Ra) specified by JIS B 0601 is increased. However, the central line average surface roughness (Ra) is preferably 2.0-10.0 nm and more preferably 2.0-5.0 nm, in view of avoiding the lowered front contrast of a liquid crystal display due to light scattering.

For the dielectric covered electrode used in the present invention, another preferable aspect to bear large electric power is that a heat-resistant temperature is 100° C. or more. The heat-resistant temperature is more preferably 150° C. or more and specifically preferably 150° C. or more, while the upper limit temperature is 500° C. or more. The heat-resistant temperature means the highest temperature at which no insulation breakdown occurs and the dielectric covered electrode can bear under a normally dischargeable condition. Such a heat-resistant temperature can be attained by suitably combining the methods, for example, a method to apply a dielectric by the above-mentioned ceramic spray coating or by layered glass lining in which each layer has a different amount of mixed bubbles, and a method to suitably select materials of which difference in the line coefficient of thermal expansion with that of the base metal is within the allowable range.

In the present invention, it is necessary to use an electrode which can maintain a uniform glow discharge state when such a voltage is applied.

In the present invention, as an electric power to apply between the opposed electrodes, an electric power of 1-50 $W/cm^2$ is applied to the second electrode to excite the discharge gas to generate plasma. The electric power is preferably 1.2-30 $W/cm^2$.

Here, with respect to a method to apply a high frequency power supply, either one of a continuous oscillation mode using a continuous sign wave, which is called as a continuous mode; or an intermittent mode in which ON/OFF is intermittently conducted, which is called as a pulse mode, may be adopted. However, it is preferable that a continuous sign wave is applied to the second electrode since a denser and favorable plasma treatment can be conducted.

As the electric discharge condition in the present invention, a high frequency voltage is applied to the discharge space between the opposed first electrode and second electrode, where it is preferable that the high frequency voltage at least has a superimposed component of a voltage component of the first frequency $\omega_1$ and a voltage component of the second frequency $\omega_2$ which is higher that the above first frequency $\omega_1$.

The aforementioned high frequency voltage has the superimposed component of the voltage component of the first frequency $\omega_1$ and the voltage component of the second frequency $\omega_2$ which is higher that the above first frequency $\omega_1$, and the waveform is of a sign wave of $\omega_1$ on which the sign wave of $\omega_2$ is superimposed. The waveform is not limited to a sign wave, and both the waveforms may be of a pulse wave, or one may be a pulse wave while the other may be a sign wave. Also, a third voltage component may be contained. However, in the present invention, a dense and favorable film is obtained when a continuous sign wave is applied to the second electrode.

In the present invention, a discharge starting voltage refers to a lowest voltage at which discharge can be conducted in the practically used discharge space (namely, for example, construction of electrodes) and the reaction condition (for example, a gas condition). The discharge starting voltage slightly depends on the gas species supplied to the discharge space and the kind of the dielectric, however, the discharge starting voltage is almost comparative with the discharge starling voltage only in a discharge gas.

It is deduced that a high density plasma which is necessary to conduct a high quality plasma treatment could be obtained by applying the above-mentioned high frequency voltage to the space between opposed electrodes (namely, the discharge space) to generate discharge necessary for the plasma treatment.

In the present invention, a concrete method to apply a high frequency voltage to the discharge space is to use the following plasma treatment device (also referred to as an atmospheric pressure plasma treatment device), namely, in the plasma treatment device, the first power supply which supplies the first high frequency voltage of which frequency is $\omega_1$ and voltage is $V_1$ is connected to the first electrode constituting the opposed electrode, and the second power supply which supplies the second high frequency voltage of which frequency is $\omega_2$ and voltage is $V_2$ is connected to the second electrode.

The important feature when high frequency voltages are applied from such two high frequency power supplies is that the first frequency $\omega_1$ is needed to start discharge of a discharge gas having a high discharge starting voltage and the second frequency $\omega_2$ is needed to form a dense and high quality thin film by increasing the plasma density.

In the present invention, it is preferred that a high frequency voltage of around 1-200 kHz is applied by the first electrode using the first power supply and a high frequency voltage of around 800-15 MHz is applied by the second electrode using the second power supply.

Further, the first power supply of the plasma treatment device used for the present invention preferably has a power to apply a high frequency voltage higher that the high frequency voltage applied by the second power supply.

Also, as another electric discharge conditions in the present invention, the discharge starting voltage IV meets the following relationship, when a high frequency voltage is applied between the opposing first electrode and second electrode and the high frequency voltage is obtained by superimposing the first high frequency voltage $V_1$ and the second high frequency voltage $V_2$:

$$V_1 \geq IV > V_2 \text{ or } V_1 > IV \geq V_2,$$

or, more preferably, $$V_1 > IV > V_2.$$

The definitions of a high frequency and a discharge starting potential, and the method to apply the aforementioned high frequency voltage to the space between the opposed electrodes are the same as those described above.

Here, the high frequency voltage (namely, the applied voltage) and the discharge starting potential as used in the present invention represent those measured by the following methods.

Method of measuring the high frequency voltages $V_1$ and $V_2$ (unit kV/mm):

Each voltage is measured by setting a high frequency probe (P6015A) to each electrode, and by connecting the high frequency voltage probe to an oscilloscope (TDS3012B, produced by Tektronix).

Measuring method of discharge starting potential IV (unit: kV/mm):

After supplying a discharge gas between the electrodes, the voltage between the electrodes is increased. The voltage at which discharge starts is defined as a discharge starting voltage IV. The same measuring instrument as used in the above measurement of a high frequency voltage is used.

In the present invention, by selecting a discharge condition in which a higher voltage is applied, discharge is started and a high density and stable plasma state is maintained, even when a discharge gas exhibiting a higher discharge starting voltage, such as nitrogen, is used, whereby high quality film formation can be conducted.

When a nitrogen gas is used as a discharge gas in the above measurement, the discharge starting voltage IV is around 3.7 kV/mm. Accordingly, when a discharge starting voltage $V_1 \geq 3.7$ kV/mm is applied, the nitrogen gas can be excited and brought into a discharge state.

Examples of a discharge gas include: nitrogen; rare gases such as helium and argon; air and hydrogen. These gases may be used alone or in combination by mixing, however, using nitrogen is specifically preferable due to an economical advantage compared with when a rare gas such as helium or argon is used. It is preferable that the amount of a discharge gas in the discharge space is 70-100% by volume based on the total amount of the gas supplied to the discharge space.

The power supplies equipped to a plasma discharge treatment device (namely, an atmospheric pressure plasma treatment device) used in the present invention are the same as those described above. However, they are classified into those used for the first power supply (a high frequency power supply) and those used for the second power supply (a high frequency power supply) according to the frequency.

(The First Power Supply)

| Applied Power supply | Manufacturer | Frequency |
|---|---|---|
| A1 | Shinko Electric Co., Ltd. | 3 kHz |
| A2 | Shinko Electric Co., Ltd. | 5 kHz |
| A3 | Kasuga Electric Works, Ltd. | 15 kHz |
| A4 | Shinko Electric Co., Ltd. | 50 kHz |
| A5 | Haiden Laboratory | 100 kHz* |
| A6 | Pearl Kogyo Co., Ltd. | 200 kHz |

The power supply marked * is an impulse high frequency power supply of Haiden Laboratory (100 kHz in continuous mode).

(The Second Power Supply (High Frequency Power Supply))

| Applied Power supply | Manufacturer | Frequency |
|---|---|---|
| B1 | Pearl Kogyo Co., Ltd. | 800 kHz |
| B2 | Pearl Kogyo Co., Ltd. | 2 MHz |
| B3 | Pearl Kogyo Co., Ltd. | 13.56 MHz |
| B4 | Pearl Kogyo Co., Ltd. | 27 MHz |
| B5 | Pearl Kogyo Co., Ltd. | 150 MHz |

Any of the above commercially available power supplies can be used in the present invention.

It is preferred that at least one of the aforementioned opposed electrodes has a means to control the thickness and has a gas supply means to supply a discharge gas between the aforementioned opposed electrodes. Further, it is preferred that an electrode temperature control means which controls the electrode temperature is contained.

It is obvious that, although no base metal and dielectric is illustrated in the electrodes shown in FIGS. 1 and 2, the base metals are covered with a similar dielectric as shown in FIG. 3 or 4.

<Corona Treatment>

Among surface hydrophilic treatments, a corona treatment (also referred to as a corona discharge treatment) is one of the best known methods, and can be conducted according to the methods conventionally known in the art, for example, those disclosed in Examined Japanese Patent Publication Nos. 48-5043 and 47-51905, and JP-A Nos. 47-28067, 49-83767, 51-41770 and 51-131576. As a corona treatment device, applicable are varieties of commercially available corona treatment devices which have been used for a means for surface modification of such as a plastic film. Of these, a corona treatment devices produced by SOFTAL Corona & Plasma GmbH having multi-knife electrodes is constitute of a lot of electrodes, and has a structure to send air among the electrodes, whereby over heat of the film can be avoided and a low molecular weight compound can be removed. Accordingly, it is one of the specifically useful corona treatment devices in the present invention, since the energy efficiency is very high and a high corona treatment can be conducted.

The corona treatment condition depends on, for example, the kind of used film, the kind of adhesive, and kind of corona treating device. However, the energy density for one treatment is preferably 20-400 W·min/m$^2$. A treatment with energy as low as possible is more preferable than a treatment with higher energy in view of prevention of deterioration of the protective film to be treated and prevention of bleeding out of the additive contained in the protective film, whereby being effective for improvement of the adhesiveness. When one treatment is not sufficient, multiple treatments of twice or more improve the adhesiveness.

In order to use a cellulose ester film of the present invention for a purpose of, for example, a protective film of a polarizing plate, it is necessary to control the surface energy of at least one surface of the protective film within a suitable range. Accordingly, a surface treatment as aforementioned is carried out.

A polarizing plate employing a polarizing plate protective film being subjected to a hydrophilic treatment of the present invention can be used for a liquid crystal display.

A polarizing plate of the present invention is characterized by being a polarizing plate constituted of a polarizer, adhered with the aforesaid polarizing plate protective film according to the present invention on at least one surface of the polarizer. A liquid crystal display device of the present invention is characterized in that a polarizing plate according to the present invention is adhered on at least one liquid crystal cell surface via an adhesive layer.

A polarizing plate of the present invention can be prepared by an ordinary method. The protective film of the present invention, the polarizer side of which being subjected to a hydrophilic treatment, is preferably adhered on at least one surface of a polarizer which has been prepared by immersion stretching in an iodine solution by use of a completely saponificated type polyvinyl alcohol aqueous solution.

On the other surface, said cellulose ester film may be utilized or another polarizing plate protective film may be utilized.

Cellulose ester film (such as Konica Minolta TAC KC8UX, KC5UX, KC8UCR3, KC8UCR4, KC8UCR5, KC8UY, KC4UY, KC4UE, KG8UE, KC8UY-HA, KC8UX-RHA, KC8UXW-RHA-C, KC8UXW-RHA-NC, and KC4UXW-RHA-NC manufactured by Konica Minolta Opto. Inc.) available on the market is also preferably utilized.

Onto the polarizing plate protective film used for the surface side of a display unit, it is preferable to provide an antireflection layer, an antistatic layer, an antifouling layer, and a back coat layer in addition to an antiglare layer or a clear hard coat layer.

A polarizer as a primary composing element of the polarizing plate is an element to pass light of a polarized wave plane of a predetermined direction, and a typical polarizer known at present is polyvinyl alcohol type polarizing film, which includes polyvinyl alcohol film dyed with iodine and one dyed with dichroic dye.

As a polarizer, utilized is one in which a polyvinyl alcohol aqueous solution is made to film, and the obtained film is uniaxially stretched and dyed, or is uniaxially stretched after having been dyed, preferably followed by being subjected to a durability treatment with a boron compound. The layer thickness of a polarizer is preferably 5 to 30 μm and specifically preferably 10 to 20 μm.

Further, ethylene modified polyvinyl alcohol which is described in such as JP-A 2003-248123 and JP-A 2003-

342322 and has an ethylene unit content of 1 to 4 mol %, a polymerization degree of 2,000 to 4,000 and a saponification degree of 99.0 to 99.99 mol % is also preferably utilized.

Among them, ethylene modified polyvinyl alcohol having a hot water breaking temperature of 66 to 73° C. is preferably utilized.

A polarizer utilizing this ethylene modified polyvinyl alcohol film is excellent in polarizing ability and durability, as well as exhibits few color spottiness, and is specifically preferably applied in a large size liquid crystal display device.

A polarizer prepared in the above manner, generally on the both surface or one surface of which protective film is adhered, is utilized as a polarizing plate. An adhesive employed at the time of pasting includes a PVA type adhesive and an urethane type adhesive, however, among them preferably utilized is a PVA type adhesive.

(Liquid Crystal Display)

By using the polarizing plate according to the present invention for a liquid crystal display, various kinds of the liquid crystal displays of the present invention excellent in visibility can be produced.

The polarizing plate of the present invention can be used for liquid crystal displays with various drive modes, such as STN, TN, OCB, HAN, VA (MVA, PVA), IPS, and OCB.

It is preferable to use for a VA (MVA, PVA) mode liquid crystal display.

Especially, even if a liquid crystal display has a large screen more than 30 type, it is possible to obtain a liquid crystal display in which there are few environmental variations, light leakage is reduced, and visibility, such as color tone unevenness and front contrast is improved.

EXAMPLES

The present invention will be concretely explained with referring to examples below, however, the present invention is not limited thereto.

<Preparation of Cellulose Ester Film 101>

<Minute-Particles Dispersion Liquid>

| | |
|---|---|
| Minute-particles (Aerosil R812 produced by Nippon Aerosil Co., Ltd.) | 11 parts by mass |
| Ethanol | 89 parts by mass |

After stirring/mixing the above materials with a dissolver for 50 minutes, further dispersion was carried out using a MANTON-GAULIN homogenizer.

<Minute-Particles Additive Liquid>

CE-1 (diacetyl cellulose: L20, produced by Daicel Corporation) was added to a dissolving tank incorporating methylene chloride, followed by complete dissolution via heating. The resulting mixture was filtered with AZUMI FILTER No. 244 produced by Azumi Filterpaper Co., Ltd. While vigorously stirring the cellulose ester solution after filtration, a minute-particle dispersion was gradually added. Further, dispersion was carried out via an attritor so that the diameter of the secondary particles reached the predetermined value. The resulting dispersion was filtered with FINE MET NF, produced by Nippon Seism Ca, Ltd., whereby a minute-particle additive liquid was prepared.

| | |
|---|---|
| Methylene chloride | 99 parts by weight |
| L20 | 4 parts by weight |
| Minute-particle dispersion | 11 parts by weight |

A primary dope liquid having the following composition was prepared using L20.

Initially, added were methylene chloride and ethanol into a pressurized dissolving tank. While stirring, L20 was fed into the pressurized dissolving tank incorporating solvents. The resulting mixture was heated while stirring to realize complete dissolution. Further, two kinds of additives listed in Table 1 were added and dissolved. The resulting mixture was filtered via AZUMI ROSHI No. 244, produced by Azumi Filterpaper Co., Ltd., whereby a primary dope liquid was prepared.

Into 100 parts by mass of the primary dope liquid, 2 parts by mass of minute-particle additive liquid was added, and the resulting mixture was vigorously blended via an in-line mixer (Toray static type in-line mixer HI-MIXER, SWJ). Subsequently, the above blend was uniformly cast onto a 2 m wide stainless steel band support by employing a belt casting apparatus. On the stainless steel band support, solvents were evaporated to a residual solvent amount of 110%, followed by peeling from the stainless steel band. During peeling, tension was applied to result in a longitudinal (MD) stretching factor of 1.02. Subsequently, both edges of the resulting web was held via the tenter of which temperature was set at 160° C., and stretching was carried out so that the stretching factor in the transverse direction (TD) was 1.25. The amount of the residual solvents at initiation of stretching was 30%.

After stretching, the resulting width was maintained for several seconds. After relaxing the tension in the transverse direction, width holding was released. Further, drying was carried out in a drying zone set at 125° C. during conveyance over 30 minutes, whereby 40 μm thick 1.5 m wide cellulose ester film 101 of the present invention was prepared which carried knurling of a width of 1 cm and a height of 8 μm at the edges.

<Primary Dope Liquid Composition>

| | |
|---|---|
| Methylene chloride | 300 parts by weight |
| Ethanol | 30 parts by weight |
| L20 | 100 parts by weight |
| Additive A (Compound A-5) | 7 parts by weight |
| Additive B (Compound B-1) | 6 parts by weight |

<Preparation of Cellulose Ester Films 102-104>

Cellulose ester films 102-104 were prepared in the same manner as above, except that the additives were changed to those listed in Table 1.

<Preparation of Cellulose Ester Film 105>

Cellulose ester film 105 was prepared in the same manner as above, except that the used cellulose ester was changed to CE-2 (Ca394-60S produced by Eastman Chemical Company), and the additives A and B were changed to those listed in Table 1.

<Preparation of Cellulose Ester Film 106>

Cellulose ester film 106 was prepared in the same manner as above, except that the used cellulose ester was changed to CE-3 (Ca398-30S produced by Eastman Chemical Company), and the additives A and B were changed to those listed in Table 1.

<Preparation of Cellulose Ester Film 107>

Cellulose ester film 107 was prepared in the same manner as above, except that the used cellulose ester was changed to CE-4 (1 a 50:50 mixture of Ca394-60S and Ca398-6, produced by Eastman Chemical Company), and the additives A and B were changed to those listed in Table 1.

<Preparation of Cellulose Ester Film 108>

Cellulose ester film 108 was prepared in the same manner as above, except that the used cellulose ester was changed to CE-5 (LM80 produced by Daicel Corporation), and the additives A and B were changed to those listed in Table 1.

<Preparation of Cellulose Ester Film 109>

Cellulose ester film 108 was prepared in the same manner as above, except that the used cellulose ester was changed to CE-6 (LT35 produced by Daicel Corporation), and the additives A and B were changed to those listed in Table 1.

<Preparation of Cellulose Ester Film 110>

Cellulose ester film 110 was prepared in the same manner as above, except that the used cellulose ester was changed to CE-7 (CAP 141-20 produced by Eastman Chemical Company), and the additives A and B were changed to those listed in Table 1.

<Preparation of Cellulose Ester Film 111>

Cellulose ester film 111 was prepared in the same manner as above, except that the used cellulose ester was changed to CE-8 (Cellulose acetate propionate having an acetyl substitution degree of 1.56, a propionyl substitution degree of 0.90 and a total substitution degree of 2.46, and the additives A and B were changed to those listed in Table 1.

TABLE 1

| Cellulose ester film No. | Cellulose ester | Substitution degree Ac | Pr | Total substitution degree | SP value | Additive A | Additive B | Before hydrophilic treatment $\gamma_{sh}$ | $\gamma_{sp}$ | $\gamma_{sh}/\gamma_{sp}$ | Retardation Ro | Rt |
|---|---|---|---|---|---|---|---|---|---|---|---|---|
| 101 | CE-1 | 2.41 | 0.00 | 2.41 | 12.2 | Compound A-5 | Compound B-14 | 9.2 | 28.0 | 0.33 | 50 | 125 |
| 102 | CE-1 | 2.41 | 0.00 | 2.41 | 12.2 | TPP | BDP | 10.3 | 21.0 | 0.49 | 35 | 90 |
| 103 | CE-1 | 2.41 | 0.00 | 2.41 | 12.2 | PETB | Compound B-17 | 7.9 | 30.9 | 0.26 | 43 | 117 |
| 104 | CE-1 | 2.41 | 0.00 | 2.41 | 12.2 | Compound 16 | EPEG | 9.7 | 24.8 | 0.39 | 38 | 104 |
| 105 | CE-2 | 2.43 | 0.00 | 2.43 | 12.1 | Compound A-5 | Compound B-14 | 8.1 | 29.6 | 0.27 | 45 | 125 |
| 106 | CE-3 | 2.48 | 0.00 | 2.48 | 12.0 | Compound A-5 | Compound B-14 | 8.5 | 30.5 | 0.28 | 55 | 130 |
| 107 | CE-4 | 2.28 | 0.00 | 2.28 | 12.4 | Compound A-5 | Compound B-14 | 8.6 | 29.2 | 0.29 | 40 | 118 |
| 108 | CE-5 | 2.15 | 0.00 | 2.15 | 12.7 | Compound A-5 | Compound B-14 | 9.3 | 27.6 | 0.34 | 80 | 225 |
| 109 | CE-6 | 2.88 | 0.00 | 2.88 | 11.3 | Compound A-5 | Compound B-14 | 5.5 | 34.8 | 0.16 | 5 | 30 |
| 110 | CE-7 | 1.92 | 0.74 | 2.66 | 11.5 | Compound A-5 | Compound B-14 | 6.3 | 33.5 | 0.19 | 45 | 120 |
| 111 | CE-8 | 1.56 | 0.90 | 2.46 | 11.8 | Compound A-5 | Compound B-14 | 6.9 | 32.2 | 0.21 | 52 | 125 |

The compounds shown in the table are as follows.

TPP: Triphenyl phosphate

BDP: Biphenyldiphenyl phosphate

PETB: Pentaerythritol tetrabenzoate

EPEG: Ethylphthalyl ethylglyeolate

<Preparation of Polarizing Plate>

Polarizing plates were prepared according to the method listed below while conducting a hydrophilic treatment on each of the obtained cellulose ester films 101-111 under the condition listed in Tables 2-4 using a device shown in FIG. 1.

TABLE 2

| Polarizing plate No. | Cellulose ester film No. | Hydrophilic treatment | Treatment time (second) | After hydrophilic treatment $\gamma_{sh}$ | $\gamma_{sp}$ | $\gamma_{sh}/\gamma_{sp}$ | Internal haze | Ra | Contamination of process after hydrophilic treatment | PVA adhesiveness | Front contrast ratio of liquid crystal display | Remarks |
|---|---|---|---|---|---|---|---|---|---|---|---|---|
| 201 | 101 | **1 | 3 | 28.2 | 8.1 | 3.50 | 0.12 | 10.2 | A | A | B | Inv. |
| 202 | 101 | **1 | 1.5 | 25.6 | 10.0 | 2.56 | 0.03 | 6.8 | A | A | A | Inv. |
| 203 | 101 | **1 | 1 | 23.1 | 14.8 | 1.56 | 0.03 | 5.5 | A | A | A | Inv. |
| 204 | 101 | **1 | 0.3 | 17.6 | 12.0 | 1.47 | 0.02 | 3.6 | A | C | A | Comp. |
| 205 | 101 | **2 | 1.5 | 25.3 | 10.2 | 2.48 | 0.05 | 2.9 | A | A | A | Inv. |
| 206 | 101 | **3 | 3 | 27.1 | 9.1 | 2.98 | 0.03 | 5.8 | A | A | A | Inv. |
| 207 | 101 | **3 | 1 | 20.4 | 13.4 | 1.52 | 0.04 | 4.7 | A | A | A | Inv. |
| 208 | 101 | Corona treatment | — | 19.4 | 12.4 | 1.57 | 0.02 | 8.5 | A | A | A | Inv. |
| 209 | 101 | * | — | 28.1 | 8.8 | 3.19 | 0.06 | 1.8 | B | A | A | Comp. |
| 210 | 102 | **1 | 1.5 | 26.1 | 9.6 | 2.72 | 0.04 | 8.1 | A | A | A | Inv. |
| 211 | 102 | * | — | 27.8 | 8.6 | 3.23 | 0.03 | 1.6 | B | A | A | Comp. |
| 212 | 103 | **1 | 1.5 | 20.6 | 12.6 | 1.64 | 0.03 | 6.7 | A | A | A | Inv. |
| 213 | 103 | * | — | 29.3 | 7.9 | 3.71 | 0.02 | 1.7 | B | A | A | Comp. |
| 214 | 104 | **1 | 1.5 | 22.7 | 12.0 | 1.89 | 0.03 | 6.5 | A | A | A | Inv. |
| 215 | 104 | * | — | 26.4 | 8.3 | 3.18 | 0.03 | 1.9 | B | A | A | Comp. |
| 216 | 105 | **1 | 3 | 27.4 | 8.6 | 3.20 | 0.15 | 8.6 | A | A | B | Inv. |
| 217 | 105 | **1 | 0.3 | 19.0 | 13.7 | 1.39 | 0.01 | 2.4 | A | C | A | Comp. |
| 218 | 106 | **1 | 1.5 | 24.1 | 9.30 | 2.60 | 0.07 | 6.9 | A | A | A | Inv. |
| 219 | 107 | **1 | 1 | 19.6 | 10.9 | 1.80 | 0.02 | 1.9 | A | B | A | Inv. |
| 220 | 108 | **1 | 0.5 | 22.2 | 13.8 | 1.61 | 0.02 | 3.8 | A | A | A | Inv. |
| 221 | 108 | * | — | 29.4 | 7.7 | 3.82 | 0.04 | 1.8 | B | A | A | Comp. |
| 222 | 109 | **1 | 10 | 20.3 | 11.7 | 1.74 | 0.55 | 2.4 | B | A | C | Comp. |

TABLE 2-continued

| Polarizing plate No. | Cellulose ester film No. | Hydrophilic treatment | Treatment time (second) | After hydrophilic treatment $\gamma_{sh}$ | $\gamma_{sp}$ | $\gamma_{sh}/\gamma_{sp}$ | Internal haze | Ra | Contamination of process after hydrophilic treatment | PVA adhesiveness | Front contrast ratio of liquid crystal display | Remarks |
|---|---|---|---|---|---|---|---|---|---|---|---|---|
| 223 | 109 | **1 | 3 | 15.7 | 18.7 | 0.84 | 0.32 | 2.1 | A | C | C | Comp. |
| 224 | 109 | **2 | 3 | 16.9 | 17.4 | 0.97 | 0.22 | 2.2 | A | C | C | Comp. |
| 225 | 109 | **3 | 3 | 14.2 | 21.2 | 0.67 | 0.19 | 3.6 | A | C | C | Comp. |
| 226 | 110 | **1 | 10 | 21.6 | 14.3 | 1.51 | 0.47 | 8.1 | B | B | C | Comp. |
| 227 | 111 | **1 | 3 | 15.4 | 17.9 | 0.86 | 0.35 | 10.6 | A | C | C | Comp. |
| 228 | 111 | **3 | 5 | 18.7 | 15.5 | 1.21 | 0.36 | 5.7 | A | C | C | Comp. |
| 229 | 111 | Corona treatment | — | 14.2 | 15.6 | 0.91 | 0.59 | 9.4 | A | C | C | Comp. |

**Plasma condition,
* Saponification treatment,
Inv. Inventive sample,
Comp. Comparative sample

TABLE 3

| Hydrophilic treatment | High freqency power source No. | Power | Main component of gas |
|---|---|---|---|
| Plasma condition 1 | 1 | 6 kV | Nitrogen + hydrogen |
| Plasma condition 2 | 2 | 3 W/cm$^2$ | Nitrogen + hydrogen |
| Plasma condition 3 | 3 | 3 W/cm$^2$ | Nitrogen + hydrogen |
| Corona treatment | Corona discharge treatment was conducted under condition of 20 W/m$^2$/minute. Each corona discharge treatment was conducted twice, using a corona treatment device having a multi-knife electrode produced by SOFTAL Corona & Plasma GmbH under a treatment condition of set energy: 40 W * min/m$^2$. | | |
| Saponification treatment | After immersion for 90 seconds at 55° C. in 2.0N aqueous solution of sodium hydroxide, washed with water, and, further, dried for 5 minutes with 120° C. air. | | |

TABLE 4

| High frequency power source | Power | |
|---|---|---|
| 1 | 100 kHz | Haiden Laboratory |
| 2 | 13.56 MHz | Pearl Kogyo Co., Ltd. |
| 3 | 27 MHz | Pearl Kogyo Co., Ltd. |

A 120 μm thick polyvinyl alcohol film was unaxially stretched (at a temperature of 110° C. and a stretching factor of 5). The resulting film was immersed for 60 seconds into an aqueous solution composed of 0.075 g of iodine, 5 g of potassium iodide, and 100 g of water, and subsequently immersed into an aqueous solution composed of 6 g of potassium iodide, 7.5 g of boric acid, and 100 g of water at 68° C. The resulting film was washed with water and dried, whereby a polarizer was prepared.

Subsequently, in accordance with following Processes 1-5, prepared was a polarizing plate in such a manner that a polarizing film was adhered to each of above cellulose ester films 101-111 and a Konica Minolta TAC KC8UY produced by Konica Minolta Opto., Inc. was adhered to the rear surface as a polarizing plate protective film.

Process 1: A hydrophilic treatment was carried out on each of cellulose ester films 101-111 under the condition listed in Tables 2-4.

Process 2: The above polarizer was immersed in a 2% by mass in solid content polyvinyl alcohol adhesive tank for 1-2 seconds.

Process 3: Excessive adhesive which was adhered onto the polarizer in Process 2 was gently wiped oft and the resulting film was arranged on the cellulose ester film being subjected to the hydrophilic treatment in Process 1, and, further, a cellulose ester film for a rear surface was arranged.

Process 4: Each of the laminate of each of cellulose ester films 101-111, the polarizer and the cellulose ester film for rear surface, prepared in Process 3, was adhered at a pressure of 20-30 N/cm$^2$, and a conveying rate of approximately 2 m/minute.

Process 5: The sample prepared in Process 4, in such a manner that the polarizer, each of cellulose ester films 101-111, and a cellulose ester film for rear surface were adhered, was dried in a dryer at 80° C. for two minutes, whereby polarizing plates 201-229 were prepared.

<Production of Liquid Crystal Display>

Liquid crystal display panels for front contrast measurement were produced as follows, and the properties as a liquid crystal display were evaluated.

The polarizing plates preliminarily adhered on both sides of a 40 type display KLV-40V2500 manufactured by SONY Corp. were removed, and the polarizing plates 201 to 229 which were prepared as mentioned above were adhered onto both sides of a glass surface of a liquid crystal cell respectively.

At this time, the polarizing plates were adhered in such a direction that the plane of the cellulose ester film of the present invention became the liquid crystal cell side and the absorption axis was directed to the same direction as the preliminarily adhered polarizing plate.

These liquid crystal displays were evaluated in terms of front contrast Results are shown in Table 2.

<<Evaluation Criteria, Evaluation Method>>

Using the obtained cellulose ester films, the following evaluation was carried out.

<Surface Free Energy>

The surface free energy of each film was measured as follows.

Each of the contact angles of a solid state specimen using three standard liquids, namely, pure water, nitromethane, and methylene iodide was measured 5 times with a contact angle meter CA-V, produced by Kyowa Interface Science Co., Ltd. and an average contact angle was obtained by averaging the measured values. Next, three components of a surface energy of solid state were computed based on the Young-Dupre's formula, and the Extended Fowkes's formula.

Young-Dupre's formula:

$$W_{SL}=\gamma L(1+\cos\theta)$$

$W_{SL}$: adhesion energy between liquid/solid $\gamma L$: surface free energy of a liquid $\theta$: contact angle of liquid/solid Extended Fowkes's formula:

$$W_{SL}=2\{(\gamma_{sd}\gamma L_d)^{1/2}+(\gamma_{sp}\gamma L_p)^{1/2}+(\gamma_{sh}\gamma L_h)^{1/2}\}$$

$\gamma L=\gamma L_d+\gamma L_p+\gamma L_h$: surface free energy of liquid $\gamma_s=\gamma_{sd}+\gamma_{sp}+\gamma_{sh}$: surface free energy of solid $\gamma_d$, $\gamma_p$, $\gamma_h$: each component of surface free energy of dispersion component, polar component and hydrogen bond component, respectively.

Since each component value of surface free energy (mN/m) of a standard liquid has been known as shown in Table 5, each component of the surface energy of a surface of solid ($\gamma_{sd}$, $\gamma_{sp}$, $\gamma_{sh}$) can be obtained by solving simultaneous equations with 3 unknowns using the value of contacting angles.

TABLE 5

| | Value of each component of surface free energy of standard liquid (mN/m) | | |
|---|---|---|---|
| | $\gamma L_p$ | $\gamma L_d$ | $\gamma L_h$ |
| Pure water | 0 | 30.4 | 42.4 |
| Nitromethane | 17.7 | 18.3 | 0 |
| Methylene iodide | 0 | 51 | 0 |

(Retardation)

Retardation values Ro and Rt were obtained according to the following Formulae.

$$Ro=(n_x-n_y)\times d$$

$$Rt=\{(n_x+n_y)/2-n_z\}\times d$$

wherein d represents a thickness (nm) of the film, refractive index $n_x$ (refractive index in the slow axis direction), $n_y$ (refractive index in the direction perpendicular to the slow axis direction in the film plane), $n_z$ (refractive index of the film in the thickness direction)

Retardation values Ro and Rt were determined at a wavelength of 590 nm using an automatic birefringent meter KOBRA-21ADH produced by Oji Scientific Instruments at 23° C. under 55% RH.

(Internal Haze)

After the prepared cellulose ester film was subjected to a humidity control in a circumstance of 23° C. and 55% RH for 5 hours or more, an internal haze was evaluated according to the following method (refer to FIGS. 1*a*-1*d*).

First, blank haze 1 of a measuring instrument other than the film is measured.

1. On a cleaned slide glass, one drop of glycerin (0.05 ml) is placed. At this time, care should be taken not to include air bubbles. A slide glass cleaned with a detergent is used since a slide glass may be stained even when it looks clean (refer to FIG. 1*a*).

2. A cover glass is placed on it. Glycerin will be spread without pressing the cover glass.

3. The slide glass is set to a haze meter to measure blank haze 1.

Subsequently, haze 2 including the specimen is measured according to the following procedure.

4. Glycerin (0.05 ml) is dropped on a slide glass (refer to FIG. 1*a*).

5. A sample film to be measured is placed on it without incorporation of air bubbles (refer to FIG. 1*b*).

6. Glycerin (0.05 ml) is dropped on the sample film (refer to FIG. 1*c*).

7. A cover glass is placed on it (refer to FIG. 1*d*).

8. The laminate obtained as above (from the top, cover glass/glycerin/sample film/glycerin/slide glass) is set to a haze meter to measure haze 2.

9. (Haze 2)−(Haze 1)=(internal haze of the cellulose ester film according to the present invention) is calculated.

The glass and the glycerin used in the above measurement are as follows.

Glass: MICRO SLIDE GLASS 59213 MATSUNAMI

Glycerol: Cica best grade (purity>99.0%), refractive index 1.47

(Surface Roughness Ra)

The surface roughness of the film was determined using Wyco produced by Veeco Instruments Inc.

(Contamination of Process after Hydrophilic Treatment)

The process after carrying out a hydrophilic treatment of a prepared cellulose ester film (a roll having width: 1980 mm, and length: 7800 m) out was visually observed, and the contamination of the process was evaluated according to the following criteria.

A: No contamination of the process was observed.

B: White foreign substance was observed on the surface of a hyderophilic treatment device or in a saponification liquid.

(PVA Adhesiveness)

The adhering face in the obtained polarizing plate was peeled by hand, and the extent of destruction of the material and peeling state was visually observed, and the adhesiveness was evaluated according to the following criteria.

A: Destruction of material (substrate) was observed.

B: Partial destruction of material (substrate) was observed, however, peeled area between the polarizer and the protective film was also observed.

C: The protective film was peeled at the interface with the polarizer.

(Front Contrast Ratio of Liquid Crystal Display)

Front contrast was measured for each liquid crystal display. The measurement of front contrast was carried out using a front contrast measuring device (EZ-contrast) produced by ELDIM, and amounts of light while displaying white and black were measured. The results of the measurement were ranked with the following superiority or inferiority criteria using the obtained front contrast values.

A: The front contrast ratio was 3000:1 or more.

B: The front contrast ratio was 2999:1 to 2000:1.

C The front contrast ratio was 1999:1 or less.

The above results of evaluation were summarized in Tables 1 and 2.

As is clear from the results shown in Tables 1 and 2, the examples of the present invention each are superior in an internal haze, a surface roughness Ra, a PVA adhesiveness and a front contrast ratio compared to those of the comparative examples. According to the aforementioned means of the present invention, it can be understood that, even when a film which may cause contamination of process in an alkali saponification process is used, a polarizing plate exhibiting excellent adhesiveness can be provided via a method which assures safety work and suffers from less environmental load. Further, it is also understood that, by using the polarizing plate, a liquid crystal display exhibiting a high viewing angle and a high visibility can be obtained.

EXPLANATION OF SYMBOLS

F Substrate
G Discharge gas
G' Exciting discharge gas
P Liquid sending pump
130 Atmospheric pressure plasma treatment apparatus
131 Atmospheric pressure plasma vessel
132 Discharge space
135 Roll electrode (the first electrode)
136 Rectangular tube-shaped electrode (the second electrode)
140 Electric field applying device
141 The first electrode
142 The second electrode
143 The first filter
144 The second filter
150 Gas supplying device
151 Gas generating device
152 Gas supplying port
153 Gas exhaust port
160 Electrode temperature control device
161 Pipe arrangement
164, 167 Guide roll
165,166 Nip roll
168,169 Partition

What is claimed is:

1. A polarizing plate comprising:

a polarizer sandwiched between protective films, wherein at least one protective film has been subjected to a hydrophilic treatment via an atmospheric pressure plasma treatment using a gas containing 50% by volume or more of nitrogen, wherein a surface energy of the at least one protective film before the hydrophilic treatment meets Formula (SI) and a surface energy of the at least one protective film after the hydrophilic treatment meets Formula (SII):

$$0.25 \leq \gamma_{sh}/\gamma_{sp} < 1.5 \quad \text{Formula (SI):}$$

$$1.5 \leq \gamma_{sh}/\gamma_{sp} \leq 4.5 \quad \text{Formula (SII):}$$

wherein $\gamma_{sh}$ represents a hydrogen bond component of the surface energy and represents a polar component of the surface energy.

2. The polarizing plate of claim 1, wherein a center line average surface roughness (Ra) of a surface of the protective film being subjected to the hydrophilic treatment is within the range of 2.0 to 10.0 nm.

3. The polarizing plate of claim 1, wherein the at least one protective film is a retardation film, wherein an in-plane retardation value Ro(590) defined by following Formula (RI) is within the range of 30 to 90 nm and a retardation value in the thickness direction Rt(590) defined by following Formula (RII) is within the range of 70 to 300 nm, $$Ro(590)=(n_x-n_y)\times d \text{ (nm)} \quad \text{Formula (RI):}$$

$$Rt(590)=\{(n_x+N_y)/2-n_z\}\times d \text{ (nm)} \quad \text{Formula (RII):}$$

wherein Ro(590) represents a value of retardation within a film plane at a wavelength of 590 nm, Rt(590) represents a value of retardation in the thickness direction of the film at a wavelength of 590 nm, d represents a thickness (nm) of the optical film, $n_x$ represents a maximum refractive index in the film plane at a wavelength of 590 nm which is also referred to as a refractive index in a slow axis direction, $n_y$ represents a refractive index in a direction perpendicular to the slow axis direction in the film plane at a wavelength of 590 nm, and $n_z$ represents a refractive index in the thickness direction of the film at a wavelength of 590 nm.

4. The polarizing plate of claim 1, wherein an internal haze of the protective film being subjected to the hydrophilic treatment is 0.1 or less.

5. The polarizing plate of claim 1, wherein the protective film being subjected to the hydrophilic treatment comprises a cellulose ester.

6. The polarizing plate of claim 1, wherein the protective film being subjected to the hydrophilic treatment comprises a cellulose ester having a solubility parameter (also referred to as a SP value) of 12.0 or more but 13.0 or less.

7. The polarizing plate of claim 1, wherein the protective film being subjected to the hydrophilic treatment comprises a diacetyl cellulose having an acetyl substitution degree of 2.1 or more but less than 2.5.

8. A method of manufacturing a polarizing plate comprising a polarizer sandwiched between protective films comprising the step of conducting a hydrophilic treatment via an atmospheric pressure plasma treatment using a gas containing 50% by volume or more of nitrogen on at least one protective film, wherein a surface energy of the at least one protective film before the hydrophilic treatment meets Formula (SI) and a surface energy of the at least one protective film after the hydrophilic treatment meets Formula (SII):

$$0.25 \leq \gamma_{sh}/\gamma_{sp} < 1.5 \quad \text{Formula (SI):}$$

$$1.5 \leq \gamma_{sh}/\gamma_{sp} \leq 4.5 \quad \text{Formula (SII):}$$

wherein $\gamma_{sh}$ represents a hydrogen bond component of the surface energy and $\gamma_{sp}$ represents a polar component of the surface energy.

9. A liquid crystal display comprising a liquid crystal cell and two polarizing plates provided on both surfaces of the liquid crystal cell, wherein at least one polarizing plate of the two polarizing plates is the polarizing plate of claim 1.

10. A liquid crystal display comprising a liquid crystal cell and two polarizing plates provided on both surfaces of the liquid crystal cell, wherein at least one polarizing plate of the two polarizing plates is a polarizing plate manufacture by the method of claim 8.

* * * * *